US007200550B2

(12) United States Patent
Menezes et al.

(10) Patent No.: US 7,200,550 B2
(45) Date of Patent: Apr. 3, 2007

(54) PROJECTING DEPENDENCIES TO GENERATE TARGET LANGUAGE DEPENDENCY STRUCTURE

(75) Inventors: Arul A. Menezes, Sammamish, WA (US); Christopher B. Quirk, Seattle, WA (US); Colin A. Cherry, Edmonton (CA)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/014,108

(22) Filed: Dec. 16, 2004

(65) Prior Publication Data

US 2006/0111896 A1 May 25, 2006

Related U.S. Application Data

(62) Division of application No. 11/014,503, filed on Dec. 16, 2004.

(60) Provisional application No. 60/625,489, filed on Nov. 4, 2004.

(51) Int. Cl.
*G06F 17/21* (2006.01)

(52) U.S. Cl. .................. 704/10; 704/2; 704/5; 704/277

(58) Field of Classification Search ............. 704/1, 704/2, 4, 5, 7, 8, 9, 10, 251, 257, 270, 277; 364/419.02
See application file for complete search history.

(56) References Cited

U.S. PATENT DOCUMENTS 5,477,450 A * 12/1995 Takeda et al. ............... 704/2

OTHER PUBLICATIONS

Hiyan Alshawi et al., Learning dependency translation models as collections of finite-state head transducers. Computational Linguistics, 26(1):45-60, 2000.

(Continued)

*Primary Examiner*—Richemond Dorvil
*Assistant Examiner*—Huyen X. Vo
(74) *Attorney, Agent, or Firm*—Joseph R. Kelly; Westman, Champlin & Kelly, P.A.

(57) ABSTRACT

In one embodiment of the present invention, a decoder receives a dependency tree as a source language input and accesses a set of statistical models that produce outputs combined in a log linear framework. The decoder also accesses a table of treelet translation pairs and returns a target dependency tree based on the source dependency tree, based on access to the table of treelet translation pairs, and based on the application of the statistical models.

30 Claims, 16 Drawing Sheets

OTHER PUBLICATIONS

Peter F. Brown et al., The mathematics of statistical machine translation: Parameter estimation. Computational Linguistics, 19(2):263-311, Jun. 1993.

Eugene Charniak et al., Syntax-based language models for statistical machine translation. In Proceedings of the MT Summit 2003.

Colin Cherry et al., A probability model to improve word alignment. In Proceedings of the ACL, 2003.

Yuan Ding et al., Automatic learning of parallel dependency treelet pairs. In Proceedings of the First International Joint Conference on Natural Language Processing, 2004.

Yuan Ding et al., Synchronous dependency insertion grammars: A grammar formalism for syntax based statistical MT. In COLING 2004: Workshop on Recent Advances in Dependency Grammars, 2004.

Jason Eisner. Learning non-isomorphic tree mappings for machine translation. In Proceedings of the ACL, 2003.

Heidi J. Fox. Phrasal cohesion and statistical machine translation. In Proceedings of the Conference on Empirical Methods in Natural Language Proceedings, 2002.

Ulrich Germann et al., Fast decoding and optimal decoding for machine translation. In Proceedings of the ACL, 2001.

Daniel Gildea. Loosely tree-based alignment for machine translation. In Proceedings of the ACL, 2003.

Joshua Goodman. A bit of progress in language modeling, extended version. Technical Report MSR-TR-2001-72, Microsoft Research, 2001.

Jonathan Graehl et al., Training tree transducers. In Proceedings of the Joint HLT/NAACL Conference, 2004.

Kevin Knight. Decoding complexity in word-replacement translation models. Computational Linguistics: Squibs and Discussion, 25(4), 1999.

Philipp Koehn et al., Statistical phrase-based translation. In Proceedings of the Joint HLT/NAACL Conference, 2003.

Dekang Lin. A path-based transfer model for machine translation. In Proceedings of COLING, 2004.

I. Dan Melamed et al., Statistical machine translation by parsing. Technical Report 04-024, Proteus Project, 2004.

Arul Menezes et al., A best-first alignment algorithm for automatic extraction of transfer mappings from bilingual -corpora. Proceedings of the Workshop on Data-driven Machine Translation, 39, 2001.

Rada Mihalcea et al., An evaluation exercise for word alignment. In Rada Mihalcea and Ted Pederson, editors, HLT-NAACL 2003 Workshop: Building and Using Parallel Texts: Data Driven Machine Translation and Beyond, pp. 1-10, Edmonton, Alberta, Canada, May 31, 2003. Association for Computational Linguistics.

Franz Och et al., A systematic comparison of various statistical alignment models. Computational Linguistics, 29(1):19-51, Mar. 2003.

Franz J. Och. Minimum error rate training in statistical machine translation. In Proceedings of the ACL, 2003.

Franz J. Och et al., A smorgasbord of features for statistical machine translation. In Proceedings of the Joint HLT/NAACL Conference, 2004.

Franz J. Och et al., Improved statistical alignment models. In Proceedings of the ACL, pp. 440-447, Hongkong, China, Oct. 2000.

Franz J. Och et al., Discriminative training and maximum entropy models for statistical machine translation. In Proceedings of the ACL, 2002.

Franz J. Och et al., An efficient A* search algorithm for statistical machine translation. In ACL 2001: Data-Driven Machine Translation Workshop, pp. 55-62, Toulouse, France, 2001.

Kishore Papineni et al., Bleu: a method for automatic evaluation of machine translation. In Proceedings of the ACL, pp. 311-318, Philadelphia, Pennsylvania, 2002.

Eric Ringger et al., Linguistically informed statistical models of constituent structure for ordering in sentence realization. In Proceedings of COLING, pp. 673-679, 2004.

Libin Shen et al., Discriminative reranking for machine translation. In HTL/NAACL 2004, Boston, USA, May 2-7, 2004.

Christoph Tillmann et al., A DP-Based search using monotone alignments in statistical translation. In ACL, 1997.

Stephan Vogel et al., HMM-Based word alignment in statistical translation. In Proceedings of the ACL, 1996.

Stephan Vogel et al., The CMU statistical machine translation system. In Proceedings of the MT Summit, 2003.

Dekai Wu. Stochastic inversion transduction grammars and bilingual parsing of parallel corpora. Computational Linguistics, 23(3):377-403, 1997.

Dekai Wu et al., Machine translation with stochastic grammatical channel. In Proceedings of the ACL, 1998.

Kenji Yamada et al. A syntax-based statistical translation model. In Proceedings of the ACL, 2001.

Richard Zens et al., A comparative study on reordering constraints in statistical machine translation. In Proceedings of the ACL, 2003.

Richard Zens et al., Reordering constraints for phrase-based statistical machine translation. In Proceedings of COLING, 2004.

* cited by examiner

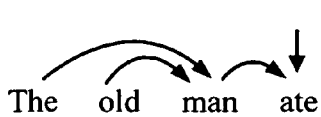
FIG. 4A
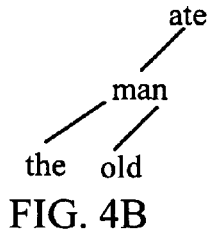
FIG. 4B
der alte mann isst
FIG. 4C
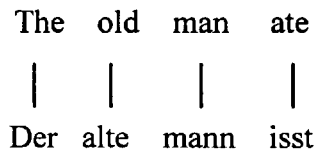
FIG. 4D
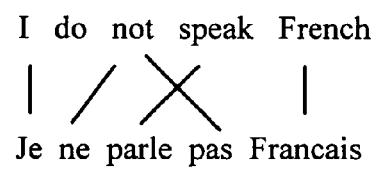
FIG. 5A
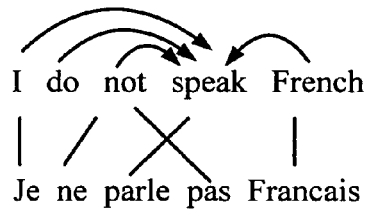
FIG. 5B
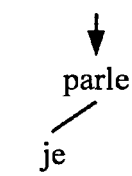
FIG. 6A
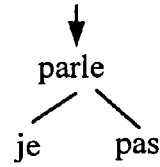
FIG. 6B
FIG. 6C
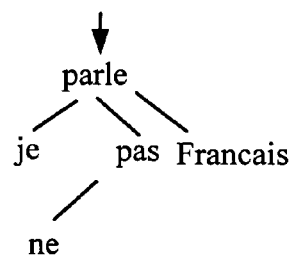
FIG. 6D
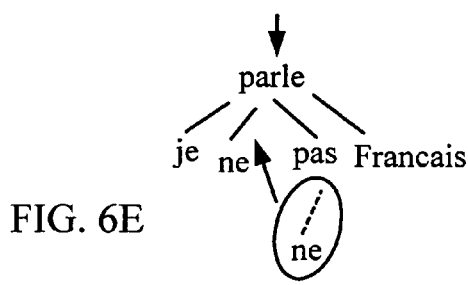
FIG. 6E

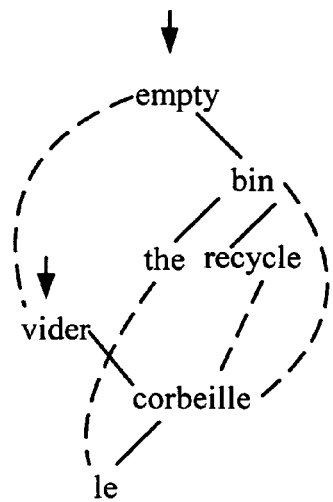
FIG. 8E
empty ------ vider
the ------ le
recycle ------ corbeille
bin
FIG. 8F
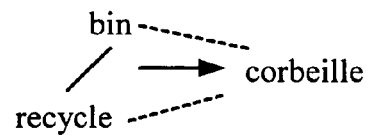
FIG. 8G
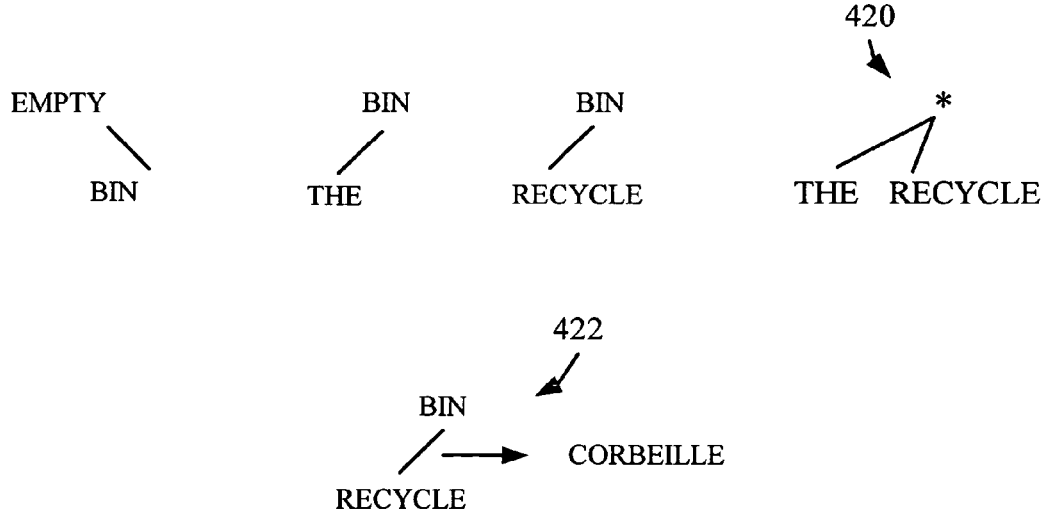
FIG. 8H man - homme
the - le
tired - fâtigue

PROJECTING DEPENDENCIES TO GENERATE TARGET LANGUAGE DEPENDENCY STRUCTURE

The present application is a divisional of and claims priority of U.S. patent application Ser. No. 11/014,503, filed Dec. 16, 2004, which is based on and claims the benefit of U.S. provisional patent application Ser. No. 60/625,489, filed Nov. 4, 2004, the content of which is hereby incorporated by reference in its entirety.

BACKGROUND OF THE INVENTION

The present invention deals with machine translation. More specifically, the present invention deals with a machine translation system that uses syntactic dependency treelets.

Machine translation involves the process of receiving an input text fragment in a source language and translating it, automatically through the use of a computing device, to a corresponding text fragment in a target language. Machine translation has typically been attempted using one of two different approaches. The first is a knowledge engineered approach, typically using a linguistic parser and hand-crafted transfer rules. Almost all commercial translation systems (such as Systran) are of this type. The second is a corpus motivated approach, typically either example-based machine translation (EBMT) or statistical machine translation (SMT). However, SMT appears more promising in current research, so this discussion will focus primarily on SMT and not EBMT. Typically the transfer-based systems incorporate linguistic information using a parser, and the SMT systems do not. Both approaches have strengths and weaknesses.

SMT systems perform well in learning translations of domain-specific terminology and fixed phrases, but simple grammatical generalizations are poorly captured and often confused during the translation process. Transfer-based systems, by contrast, often succeed in producing grammatical and fluent translations, but are highly time consuming to develop. Also, they often fail in exactly the area where SMT succeeds: domain-specificity.

Attempts have also been made to combine different aspects of the two types of machine translation systems into a single, hybrid system. However, these attempts have still suffered from disadvantages. Let us briefly survey the state-of-the-art in SMT as well as some prior art attempts to combine syntax and SMT.

Statistical machine translation initially attempted to model translation as a series of separate translation decisions, one for each word. However, the sheer computational complexity of the problem was a difficult obstacle to overcome, and it proved difficult to capture local context in a word-to-word statistical model. Thus the resulting systems were often rather slow and produced only moderate quality translations. Recently, however, statistical machine translation has shown new promise with the incorporation of techniques for performing phrasal translations. Instead of attempting to model the translation of each word independently, phrasal statistical machine translation attempts to model how chunks of words translate together. This captures an important intuition of foreign language learning—that is, small idioms and common phrases are both idiosyncratic and important for both fluency and fidelity.

Current phrasal statistical machine translation systems are conceptually simple. Beginning with a word alignment, all contiguous source and target word sequences (contiguous on the surface strings) are gathered as possible phrase translation pairs or alignment templates. These pairs are collected into a single translation repository. Then, a translation probability is associated with each distinct pair by using a maximum likelihood estimation model such as that set out in Vogel et al. *THE CMU STATISTICAL MACHINE TRANSLATION SYSTEM*, Proceedings of the MT Summit, (2003). Other probability models can be used as well. The specific translation model set out in Vogel is used in combination with at least a target language model to form a classic noisy channel model. The best scoring translation is found by a simple search: a monotone decoder assumes that source phrase order is preserved and uses Viterbi decoding to find the best path through the translation lattice. In some systems, a small amount of phrase reordering is allowed where the phrasal movement is modeled in terms of offsets.

While this type of system is an improvement over other types of systems where no reordering is allowed, the reordering model used in this type of system is limited in terms of linguistic generalizations. For instance, when translating English to Japanese, the English subject-verb-object clauses generally become Japanese subject-object-verb clauses, and English post-modifying prepositional phrases become Japanese pre-modifying prepositional phrases. While the phrasal reordering model above might learn that reorderings are more common in English-Japanese than in English-French, it does not learn that the subject is likely to stay in place while the object is likely to move before the verb; nor does it learn any generalization regarding prepositional/postpositional phrase movement. Instead, a phrase-based decoder in accordance with the prior art acts at the mercy of rote-memorized phrases and a target language model bias towards fluency, not necessarily accuracy.

In addition, as mentioned above, prior art phrasal statistical machine translation systems are currently limited to phrases that are contiguous. By this, the prior art systems meant that the phrases are contiguous in both the source and target surface strings. This limitation means that even something as simple as "not"→"ne . . . pas" cannot be learned. Using extremely large data sets for training can partially compensate for this, by simply memorizing a wide variety of possibilities. However, less common discontiguous "phrases" will be nearly impossible to learn, given practical limits on the size of the training data set.

For these reasons, and others, some researchers have attempted to incorporate syntactic information into statistical machine translation processes. One very simple method of doing this is by reranking. In other words, a baseline SMT system is used to produce an N-best list of translations, and then a group of models, possibly including syntactic models, is used to rerank the output. One such system is described in Och et al., *A SMORGASBORD OF FEATURES FOR STATISTICAL MACHINE TRANSLATION*, Proceedings of the Joint HLT/NAACL Conference (2004). This has proven to be a rather tenuous means of introducing syntactic information because an N-best list of even 16,000 translations captures only a very small fragment of the translation possibilities for a 20 word sentence and post-facto reranking provides the syntactic model no opportunity to boost or prune large sections of that search space within the baseline decoder.

Inversion transduction grammars (ITGs) are used in another prior art attempt to incorporate a notion of constituency into statistical machine translation. The basic idea is to consider alignment and translation as simultaneous parses of the source and target language. Two types of binary branching rules are allowed. Either the source and target constituents are produced in the same order, or the source and target constituents are produced in reverse order. Some such systems are described in Wu, STOCHASTIC INVERSION INDUCTION GRAMMARS AND BILINGUAL PARSING OF PARALLEL CORPORA, Computational Linguistics, 23(3):377–403 (1997); Wu and Wong, MACHINE TRANSLATION WITH A STOCHASTIC GRAMMATICAL CHANNEL, Proceedings of the ACL (1998); Zens and Ney, A COMPARATIVE STUDY ON REORDERING CONSTRAINTS AND STATISTICAL MACHINE TRANSLATION, Proceedings of the ACL (2003); and Zens et al., REORDERING CONSTRAINTS FOR PHRASE-BASED STATISTICAL MACHINE TRANSLATION, Proceedings of COLING (2004). These grammars are theoretically interesting. However, in order to make these types of processes computationally efficient, a number of severely limiting simplifying assumptions must be made. This significantly reduces the modeling power of such systems. In addition, this type of translation model acts only at the level of a single lexical item at a time (i.e., at the word level) and phrasal combinations are not modeled directly. This is a rather severe limitation. The demonstrated translation quality of these systems has not been on par with the best SMT systems.

A more recent theoretical approach has been presented using multi-text grammars and generalized multi-text grammars and attempts to generalize the inversion transduction grammar approach by allowing non-contiguous translations and loosening the reordering constraints. While this theory has been proposed, there are no details presented on parameter estimation, there is no description of how decoding in this framework is to incorporate phrasal information, no actual system has been built and no translation quality numbers presented This theory is described in greater detail in Melamed and Wang, STATISTICAL MACHINE TRANSLATION BY PARSING, Technical Report 04-024 Proteus Project (2004).

Another prior art approach related to Inversion Transduction Grammars uses head transducers to produce a translation by simultaneously parsing the source sentence and transuding a target dependency tree using a collection of transducers that apply independently to each level of a source dependency tree. These transducers are limited in scope. They rely only on very local context, such that the end result is a fundamentally word-based (as opposed to phrase-based) decoder. The transducer induction process is also likely complicated by data sparsity problems. Instead of factoring the translation modeling into several different components (such as lexical selection, ordering, etc.), only a single transducer is trained. One such system is set out in Alashawi, et al., LEARNING DEPENDENCY TRANSLATION MODELS AS COLLECTIONS OF FINITE-STATE HEAD TRANSDUCERS, Computational Linguistics, 26(1): 45–60 (2000).

A tangential line of research as formed at the confluence of dependency transducers and multi-text grammars. This line of research deals with synchronous dependency insertion grammars and is described in more detail in Ding and Palmer, SYNCHRONOUS DEPENDENCY INSERTION GRAMMARS: A GRAMMAR FORMALISM FOR SYNTAX BASED STATISTICAL MT, In COLLING 2004: Workshop on Recent Advances in Dependency Grammars (2004).

In yet another prior art attempt, in order to improve the problems with fluency in an SMT system, a parser has been employed in the target language. By employing a parser in the training data, one can learn probabilities for a set of operations to convert a target language tree to a source language string. These operations can be combined with a tree-based language model to produce a noisy channel translation search. One such system is set out in Yamada and Knight, A SYNTAX-BASED STATISTICAL TRANSLATION MODEL, Proceedings of the ACL (2001). This type of system does have some positive impact on fluency, but does not improve overall translation quality as compared to a non-syntactic SMT system.

Another prior art approach for employing dependency information in translation is by translating via paths in the dependency tree. One such system is described in Lin, A PATH-BASED TRANSFER MODEL FOR MACHINE TRANSLATION, Proceedings of COLLING (2004). This is believed to be the only prior art system to apply a separate dependency parser to the source sentence before attempting translation. While this type of system does appear to incorporate larger memorized patterns (like phrasal SMT) in combination with a dependency analysis, the statistical modeling in the system is extremely limited. Only a direct maximum likelihood estimation translation model is used. The decoding process thus does not balance fidelity against fluency using, for example, a target language model nor does it benefit from the host of other statistical models that give SMT systems their power. The paths are combined in an arbitrary order. Finally the restriction imposed by this approach that the "phrases" extracted from the dependency trees be linear paths is quite detrimental. Not only does it lose promising treelet translations in a non-linear branching configuration, but it also cannot model certain common phrases that are contiguous in the surface string but non-linear in the dependency tree. Thus, while the resulting translations seem to benefit somewhat from the use of dependency paths, the overall approach does not come close to the translation quality of a phrasal SMT decoder From the above discussion, it can be seen that the vast majority of syntactic statistical machine translation approaches have focused on word-to-word translation, instead of phrasal statistical machine translation, and have treated parsing and translation as a joint problem rather than employing a separate parser prior to translation. The one approach that uses a separate parser is very limited in scope, combines paths in an arbitrary order and has not employed a combination of statistical models which severely limits possible translation quality.

SUMMARY OF THE INVENTION

Given the present state of the technology, a context-free constituency analysis (as opposed to a dependency analysis) may seem to be a natural starting point in developing a statistical machine translation system. However, it is believed that this is not the most effective representation for syntax in machine translation. Dependency analysis, in contrast to constituency analysis, tends to bring more semantically related elements together. For instance, verbs become directly contiguous to all their arguments, not just objects. In addition, dependency trees are better suited to heavily lexicalized operations, which have proven quite effective in phrasal statistical machine translation.

In one embodiment of the present invention, a decoder receives a dependency tree as a source language input and accesses a set of statistical models that produce outputs combined in a log linear statistical framework. The decoder also accesses a table of treelet translation pairs and returns a target dependency tree based on the source dependency tree, based on access to the table of treelet translation pairs, and based on the application of the statistical models.

In one embodiment, the decoder is implemented using dynamic programming. In another embodiment, the decoder is implemented using an A* search.

BRIEF DESCRIPTION OF THE DRAWINGS

FIGS. 4A–4D illustrate generation of a dependency structure and word alignment of a pair of sentences.

FIGS. 5A and 5B illustrate a word alignment and source dependency structure for a pair of sentences.

FIGS. 6A–6E illustrate structures that show projection of dependencies from the source language dependency tree to the target language dependency tree.

FIGS. 8A–8I illustrate projection of dependencies from a source language tree to a target language tree and the extraction of treelet translation pairs where multiple words in the source language input are aligned to a single word in the target language input.

DETAILED DESCRIPTION OF ILLUSTRATIVE EMBODIMENTS

The present invention deals with machine translation using syntactic dependency trees. However, prior to describing the present invention in greater detail, one illustrative environment in which the present invention can be used will be discussed.

Figure 1:
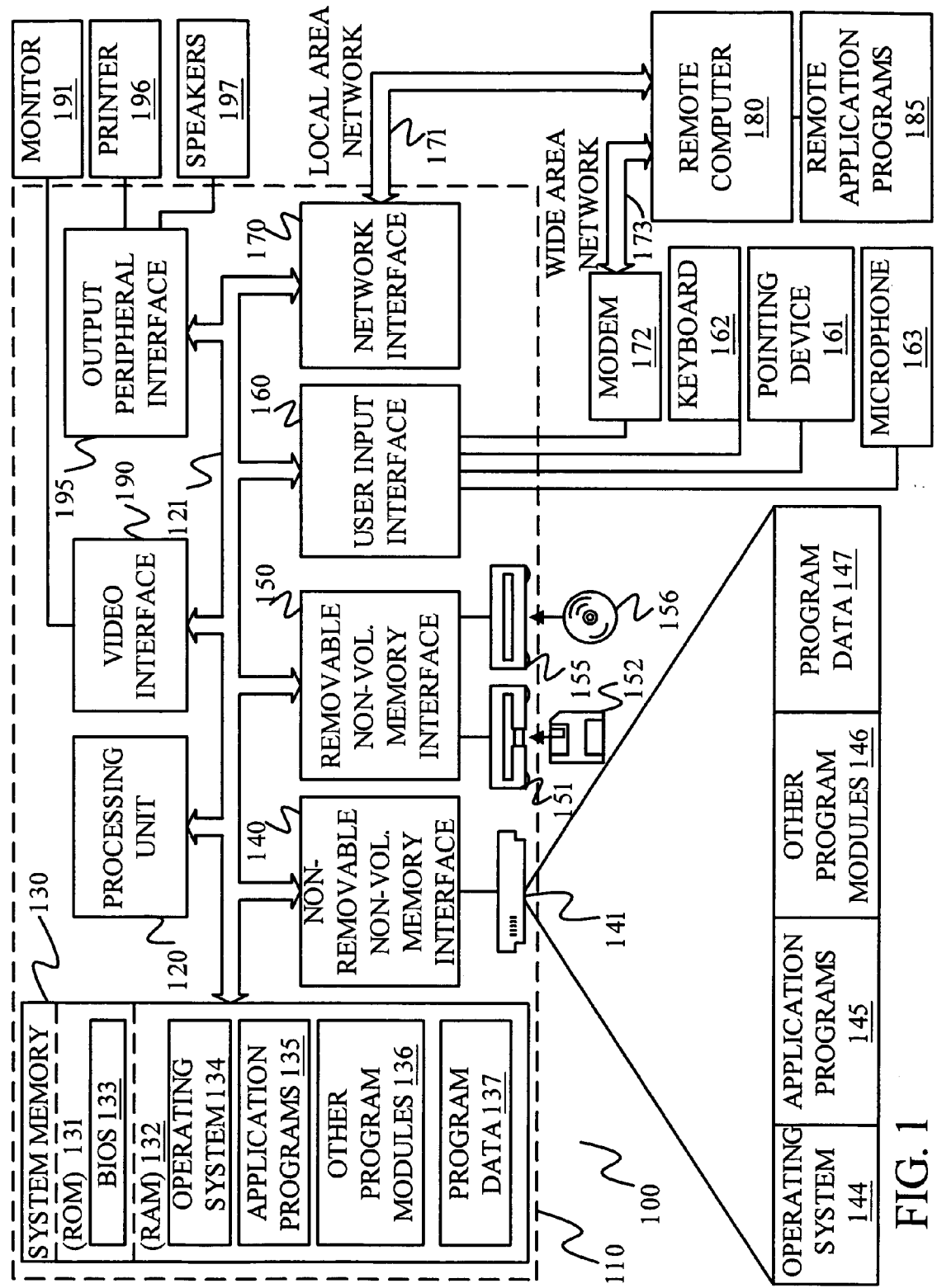
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
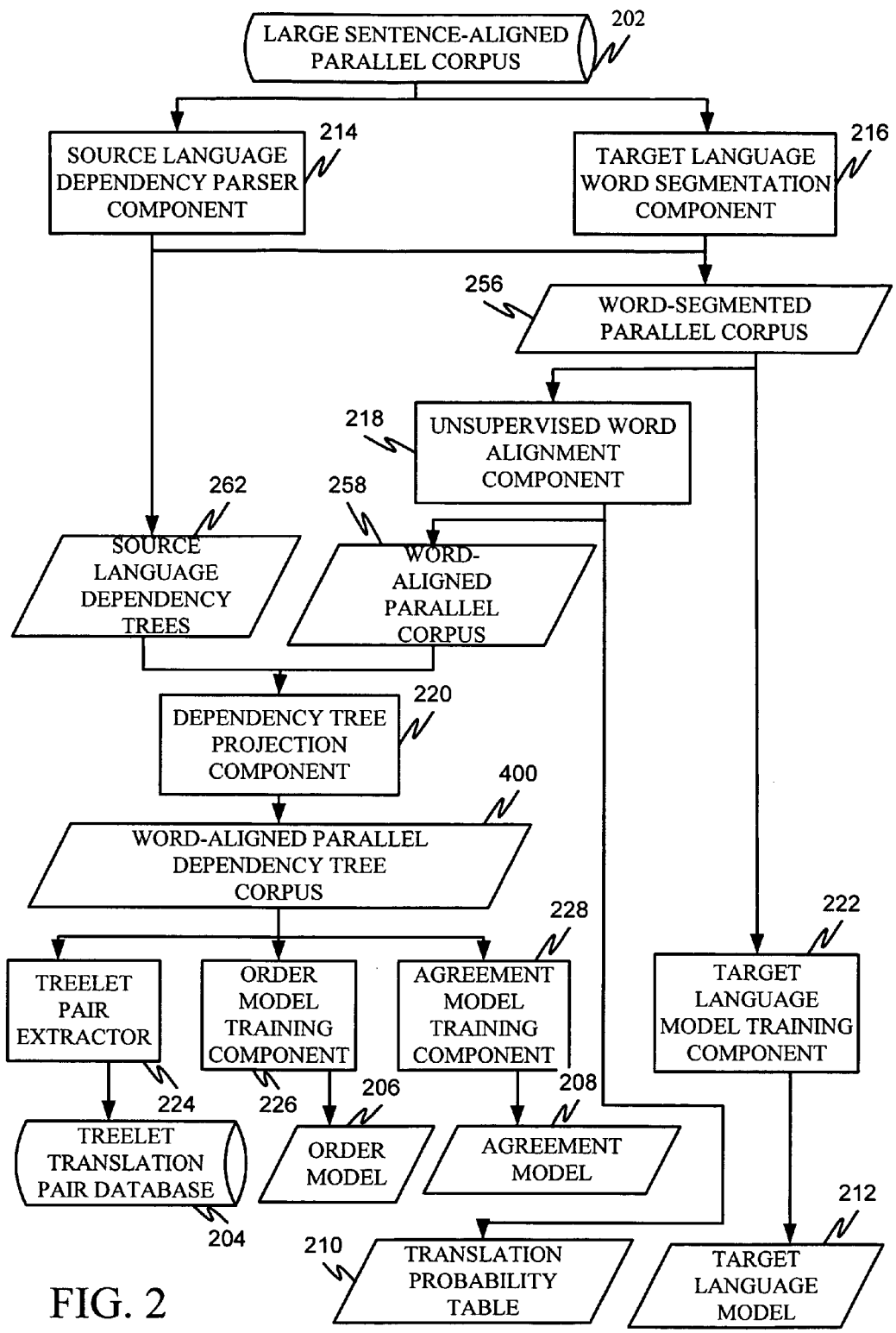
FIG. 2 is a block diagram of a training system in accordance with one embodiment of the present invention.

FIG. 2 is a block diagram illustrating a training system 200. Training system 200 is shown receiving an input which is a large sentence-aligned parallel corpus 202. Training system 200 is also shown providing an output that includes treelet translation pair database 204, order model 206, agreement model 208, translation probability table 210 and target language model 212. System 200 includes source language dependency parser component 214, target language word segmentation component 216, unsupervised word alignment component 218, dependency tree projection component 220, target language model training component 222, treelet pair extractor 224, order model training component 226, and agreement model training component 228.

Figure 3:
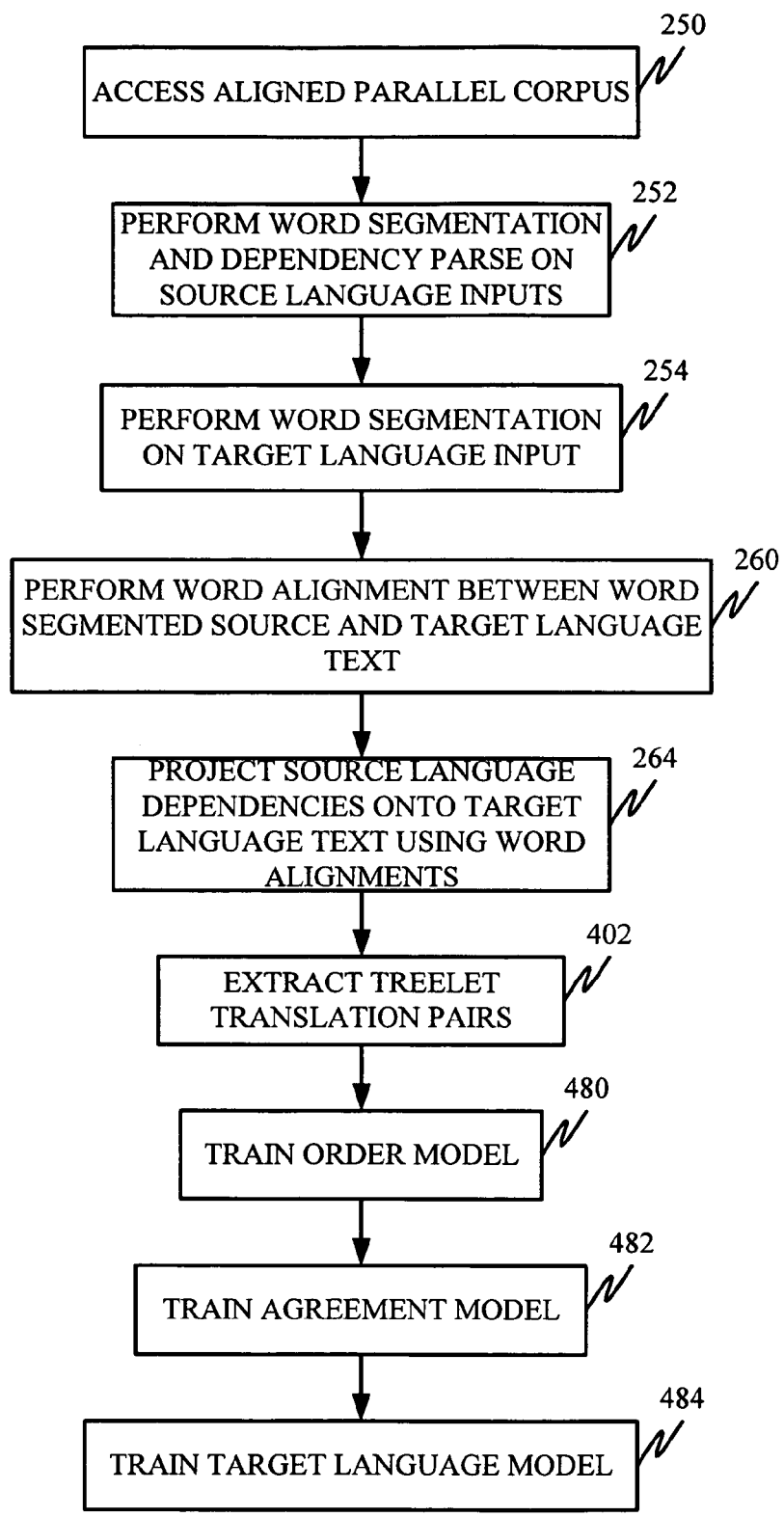
FIG. 3 is a flow diagram illustrating the overall operation of the system shown in FIG. 2.

FIG. 3 is a flow diagram illustrating the overall operation of system 200 shown in FIG. 2. First, system 200 accesses the sentence-aligned parallel corpus 202. This is indicated by block 250 shown in FIG. 3. Corpus 202 is illustratively a large parallel data corpus. That is, corpus 202 includes a plurality of pairs of sentences that are translations of one another, one sentence being in a first language (referred to herein as a source language) and the other sentence being in a second language (referred to herein as a target language).

Dependency parser component 214 accesses corpus 202 and performs a dependency parse on each of the source language sentences. This is indicated by block 252 in FIG. 3. Dependency parser component 214 is illustratively any commercially available dependency parser that takes a text fragment as an input, and performs a number of operations. First, parser component 214 identifies words in the input text fragment (that is, segments the input sentence into words). In doing this, the parser may optionally treat multiword inputs as a single word (such as White House), and may also split up terms. For instance, the parser may split the term "interest-bearing" into three words with the hyphen being its own word.

In any case, once the source input is segmented by parser 214, a head word in each text fragment is identified. Then, dependencies between all of the words in the sentence are identified as well. Therefore, the output 262 of dependency parser component 214 is a set of words with the head word identified and with dependencies between words noted.

One representation of this is shown in FIG. 4A. The source language input (or surface string) is "The old man ate". FIG. 4A shows that the surface string simply includes arrows wherein the vertical, downward pointing arrow to the word "ate" identifies "ate" as the head word in the text fragment. The arrow from the word "man" to the word "ate" indicates that the word "man" depends on the word "ate" as a pre-modifier. Similarly, the arrows from the two words "the" and "old" to the word "man" indicate that those two words depend from the word "man".

Another representation of the words and dependencies output from dependency parser component 214 is shown in FIG. 4B. The structure shown in FIG. 4B is referred to as a dependency tree where each word comprises a node of the tree and the uppermost node comprises the head word or root of the tree. When a line connecting nodes of two levels in the tree slants downward and to the left (such as the line that connects the node "ate" with the node "man"), this indicates that the lower term in the tree (in this case "man") is a pre-modifier of the upper word in the tree (in this case "ate"). Therefore, the dependency tree in FIG. 4B shows that "man" is a pre-modifier of the word "ate" and the two words "the" and "old" are both pre-modifiers of the word "man". Conversely a line sloping downwards to the right would indicate a word that is a post-modifier of its head.

Target language word segmentation component 216 is also illustratively any commercially available word segmenter that segments an input sentence in the target language into a string of words. For instance, assume that the target language sentence that is aligned with "the old man ate" shown in FIGS. 4A and 4B is the German language sentence "der alte mann isst". In that example, component 216 splits the target language sentence into the words shown in FIG. 4C. Therefore, the output of target language word segmentation component 216 is simply a list of words in the target sentence part of the aligned pair of sentences. Performing word segmentation on the target language input is indicated by block 254 in FIG. 3. (In languages such as Chinese that do not use spaces to separate words, the word segmentation task is more complex than it is in languages such as English or German.)

After the source language dependency parse is generated and the target language word segmentation has been performed, the source language dependency parse is placed adjacent the target language word segmentation to form word segmented parallel corpus 256 in FIG. 2. Thus, one of the representations from FIG. 4A or 4B is associated with the representation shown in FIG. 4C.

Next, unsupervised word alignment component 218 finds correspondences between words in the parallel aligned word segmented corpus 256. Word alignment component 218 is illustratively any commercially available word alignment component that finds correspondences between words in the word segmented versions of the target language corpus 256 and the word segmented version of the source language corpus 256. The correspondences will illustratively be indicative of a determination that the target language aligned portion is a translation of the source language portion to which it is aligned. In one embodiment, the unsupervised word alignment component uses only the segmented versions of the source language corpus and target language corpus as input. In another embodiment, the unsupervised word alignment component also uses the source language dependency trees for each of the source language parses.

In one embodiment, a word alignment of a word segmented source language sentence and a word segmented target language sentence is represented as a graph in the following manner. Each distinct source language word is a vertex in the graph, and each distinct target language word is a distinct vertex in the graph. There is a set of edges representing the correspondence between source words and target words. Each edge connects a vertex representing a source language word to a vertex representing a target language word: the graph is a bipartite graph. Other embodiments of word alignments may use different representations, such as a function from a source language word to the set of target language words to which it is aligned, but this functional representation can be easily recast in terms of the graph representation above. For the purposes of this document, a word alignment component is any component that produces a word alignment for each sentence pair that can be recast in terms of the graph representation above.

Using the example discussed thus far, FIG. 4D shows the source language portion of the aligned text on the top and the target language portion of the aligned text on the bottom with the correspondences between words annotated by lines between the two. Thus, FIG. 4D shows that word alignment component 218 has found a correspondence between the English word "the" and the German word "der", between the English word "old", and the German word "alte", between the English word "man" and the German word "mann", and between the English word "ate" and the German word "isst".

The alignment shown in FIG. 4D is fairly straightforward, because it is a one-two-one alignment. In another words, each word in the source language text is aligned with a single word in the target language text. However, there may well be more complex word alignments. For instance, in the French language, negation is typically split up into two words. One of the words resides before the verb in the sentence and the other word resides after the verb in the sentence. Therefore, assume that the parallel aligned sentences that are being processed are the English sentence "I do not speak French" and the corresponding French translation of that sentence "Je ne parle pas Francais". The negation in the French case is indicated by the words "ne . . . pas" which reside on either side of the verb "parle".

Alignment component 218 thus aligns the two sentences as shown in FIG. 5A. Note that there is no alignment to the source language word "do" and there are two words aligned with the source language word "not", those being "ne" and "pas".

The word-aligned sentences form the output of unsupervised word alignment component 218 and form word aligned parallel corpus 258 in FIG. 2. The step of performing word alignment between the word segmented source language dependency structure and the word segmented target language text is indicated by block 260 in FIG. 3. Therefore, in word-aligned parallel corpus 258, the source and target language words have associations annotated in some systematic form. Here they are simply indicated by lines connecting the words.

At this point in the processing, the source language sentence has been parsed into a source language dependency tree (or another source language dependency structure) and a word-aligned parallel corpus has been generated such that words in the source language text have been aligned with words in the target language text. FIG. 5B illustrates a structure that shows how both of these things can be shown in a single structure. The upper portion of FIG. 5B shows the source language input sentence "I do not speak French" with the dependency structure formed by the arrows as discussed above with respect to FIG. 4A. The lower portion of the structure shown in FIG. 5B includes the target language input "Je ne parle pas Francais" with its words aligned to words in the source language input. Thus, FIG. 5B represents both the source language dependency tree and the word alignments between the source language and target language inputs. The source language dependency trees are represented by numeral 262 in FIG. 2.

Dependency tree projection component 220 then projects dependencies from the source language dependency tree representation onto the aligned target language word segmented input to obtain a target language dependency tree (or dependency structure). This is indicated by block 264 in FIG. 3.

One embodiment of the dependency tree projection component progresses in the following manner.

(1) One-to-Many alignments: For all distinct sets of target words $T_i$ and $T_k$ where
  (a) All words in $T_i$ and $T_j$ are aligned to source words $s_k$ and $s_l$, and
  (b) No other target words are aligned to $s_k$ and $s_l$, and
  (c) $t_i$ is the representative element of $T_i$, and
  (d) $t_j$ is the representative element of $T_j$, create a dependency from $t_i$ to $t_j$ if and only if there is a dependency relation from $s_k$ to $s_l$ and for each $t_k$ in $T_i$ where $t_k! = t_i$, create a dependency from $t_k$ to $t_i$, and for each $t_m$ in $T_j$ where $t_m! = t_j$, create a dependency from $t_m$ to $t_j$ In one embodiment, the representative of a set of target nodes is always the rightmost node in that set. In other potential embodiments, the representative may be selected by corpus statistics regarding which should be the head, or by hand-crafted rules.

(2) One-to-One and Many-to-One alignments: Similarly, for all target words $t_i$ and $t_j$ that are uniquely aligned to distinct sets of source words $S_k$ and $S_l$, we create a dependency from $t_i$ to $t_j$ if and only if there is a dependency relation from $s_k$ to $s_l$ for some $s_k$ in $S_k$ and for some $s_l$ in $S_l$.

(3) Unaligned words: For all unaligned target words $t_i$, find the closest aligned target word to the left $t_l$ and the closest aligned target word to the right $t_r$. If $t_l$ is lower in the dependency tree, create a dependency between $t_i$ and $t_l$; otherwise create a dependency between $t_i$ and $t_r$.

(4) Unaligned Root: If the root of the source dependency tree is unaligned, then after applying all the above steps there will be multiple target dependency trees, each with a single root. Pick a representative from amongst those roots, and make all the other roots depend on this representative.

(5) Out-of-order attachment: If, after all words are attached into a single dependency tree, the order of words in the tree is different than that of the target sentence, reattach each out-of-order node to the lowest point in the tree where it would read off in the correct order.

Figure 6:
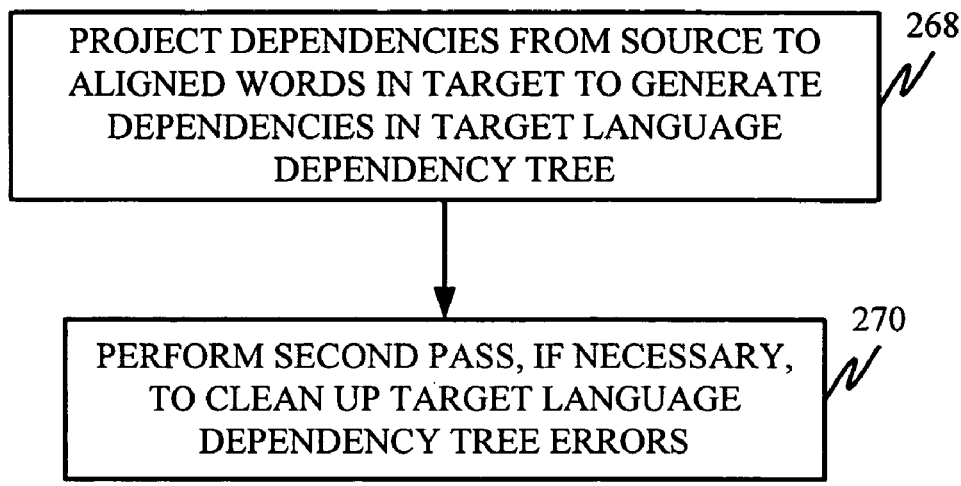
FIG. 6 is a flow diagram illustrating projection of dependencies from a source language dependency tree to a target language dependency tree.

The following paragraphs illustrate these rules with specific examples. FIG. 6 illustrates a flow diagram that shows the process by which dependencies are projected from the source language dependency tree onto the aligned target language text. Component 220 projects the dependencies from the source language dependency tree to aligned words in the target language text, in order to generate dependencies in the target language dependency tree. Projection of the dependencies onto the target language dependency tree is indicated by block 268 in FIG. 6. For instance, component 220 examines the words on the source side, to see what they depend on, and projects those same dependencies to the aligned words on the target side.

In the present example, assume that component 220 (after it has identified the root "parle" shown in FIG. 6A) starts with the word "I". It can be seen from the source language dependency structure that the word "I" depends on the word "speak" as a pre-modifier (as a modifier that occurs before the word "speak" and in the surface string). Therefore, component 220 follows the alignment from the word "I" to the word "Je" and makes the word "Je" a pre-modifier, dependent from the root "parle". This is shown in FIG. 6B.

Component 220 next encounters the word "do". Since it is not aligned to any words in the target language text, component 220 simply skips the word "do" and moves on the word "not".

The word "not" is somewhat more complicated, because it is aligned to two words "ne" and "pas" on the target side. To handle this, in accordance with one embodiment of the present invention, heuristics are employed that look at the set of words on the target side that are aligned to the single word on the source side to determine its dependency. In this embodiment, the right-most word in the set of words on the target side ("pas") is made a dependent of the head word and the order in the original word sequence on the target side is maintained to determine whether "pas" is a pre-modifier or a post-modifier in the tree. Since "pas" is after its head word "parle" in the surface string, it is made a post-modifier to that head word in the dependency tree. This is shown in FIG. 6C.

Next, the remaining words in the matching set of words on the target side, are taken in-turn, and made either pre-modifiers or post-modifiers of the right-most word "pas" based, again, on the original word order in the target surface string. In the present example, the only remaining word in the set of words that match "not" is the French word "ne". Therefore, "ne" is made a dependent of the word "pas". Since it precedes the word "pas", it is placed in the dependency tree as a pre-modifier of the word "pas". This is indicated in FIG. 6D.

Finally, component 220 arrives at the word "French" and determines that it is aligned to a single target word "Francais" and that the word "French" depends from the word "speak". Therefore, component 220 places the word "Francais" in the target language dependency tree as being dependent from the word "parle" (which is aligned to the word "speak") as a post-modifier. This is also shown in FIG. 6D.

Component 220 then computes the order in the target dependency tree. In this case, the order of the dependency tree shown in FIG. 6D would lead to the French string "Je parle ne pas Francais". Component 220 then accesses the original target language input and notices that the word "ne" is out of order, because now it follows the word "parle" in the surface string.

To accommodate for this error, and to correct a number of other potential problems as discussed below, component 220 performs a second pass, if necessary, through the target language dependency tree to clean up target language dependency tree errors. This is indicated by block 270 in FIG. 6.

Figure 6F:
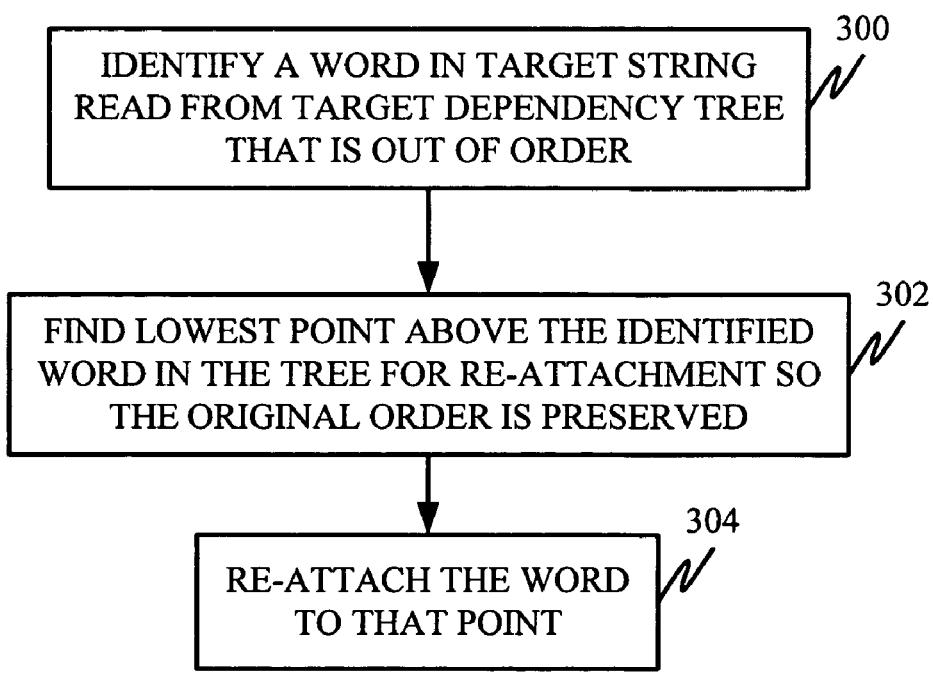
FIG. 6F is a flow diagram illustrating how nodes in the target language dependency tree are re-attached.

The first such error discussed will be that just mentioned (where a target word—the word "ne"—appears out of order in the translation read from the final target language dependency tree shown at FIG. 6D). FIG. 6F is a flow diagram illustrating how component 220 corrects this error.

First, component 220 identifies a word in the target string that is read from the target dependency tree that is out of order. This is indicated by block 300 in FIG. 6. In the present example, that word is "ne". Component 220 then identifies the lowest point above the identified word (above "ne") in the target language dependency tree for reattachment, so that the original surface string order is preserved. In this case, the lowest point above the word "ne" to preserve the original order is by attaching "ne" as a pre-modifier to the node "parle". Identifying this point is indicated by block 302 in FIG. 6. Component 320 then reattaches the word "ne" to that point. This is shown in FIG. 6E and is indicated by block 304 in FIG. 6F. Thus, the word "ne" is detached from being a pre-modifier of the word "pas" and is reattached as being a pre-modifier of the word "parle".

Figure 7:
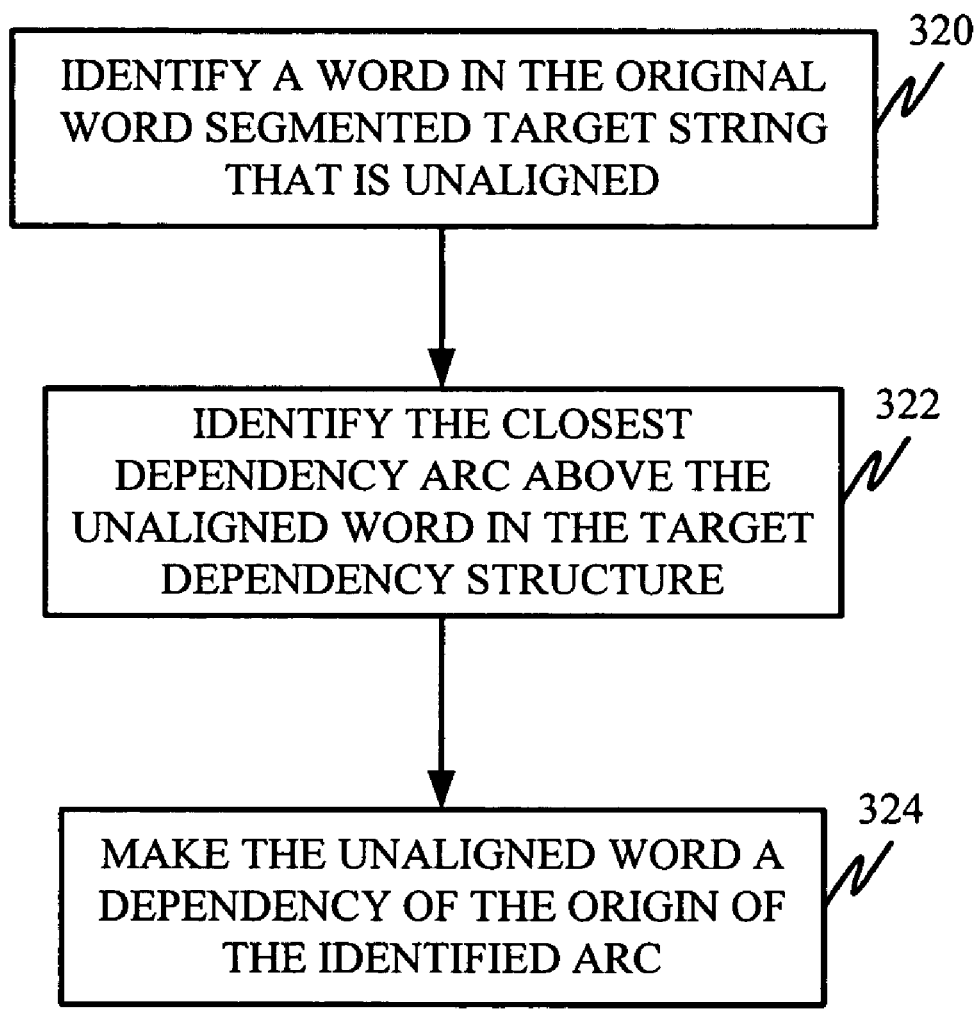
FIG. 7 is a flow diagram illustrating assignment of dependencies to unaligned target words.
Figure 7A:
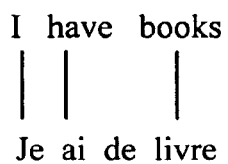
FIGS. 7A–7F illustrate projection of dependencies from a source language dependency tree to a target language dependency tree where a word in the target sentence is unaligned.

Another problem which can be encountered in the present invention arises when a word in the word segmented target string is unaligned to any word in the source string. For instance, in the French language, prepositions are often inserted after verbs, and they have no true English translation. Assume, for example, the source language input string of "I have books". The proper French translation is "Je ai de livre". The alignment between words in the source language and target language word segmented inputs is shown in FIG. 7A. It can readily be seen that the word "de" in the target language string has no alignment to the source language string.

Figure 7B:
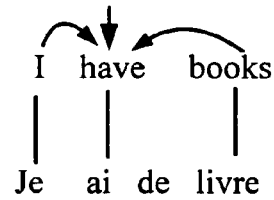
Figure 7C:
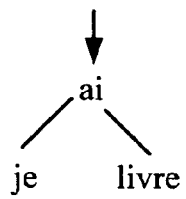
Figure 7D:

FIG. 7B shows the word alignments of FIG. 7A, along with a representation of the dependency tree (the arcs on the source language string show the dependencies on the source language input). Using the present invention to project those dependencies onto the target language string produces a target language dependency tree shown in FIG. 7C. This can also be represented as shown in FIG. 7D, as discussed in previous examples. Of course, this indicates that the word "de" does not have a dependency associated with it. Therefore, in accordance with one embodiment of the present invention, component 220 first identifies any words in the original word segmented target string that are unaligned. This is indicated by block 320 in FIG. 7. Of course, in the present example, component 220 identifies the word "de".

Next, component 220 identifies the closest dependency arc above the unaligned word in the target dependency structure. The closest dependency arc in the dependency structure shown in FIG. 7D, that is above the unaligned word "de" is the arc originating at "livre" and terminating at the word "ai". Identifying this arc is indicated by block 322 in FIG. 7.

Figure 7E:
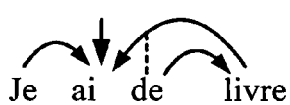
Figure 7F:
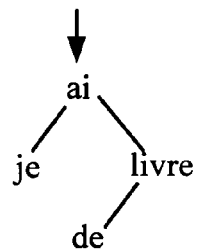

Component 220 then makes the unaligned word a dependent of the origin of the identified arc. Therefore, in the present invention, component 220 makes the word "de" dependent from the word "livre". This is shown in FIG. 7E. The dashed line extending upwardly from "de" illustrates the location of the closest arc above "de" in the dependency structure, and the arc from "de" to "livre" indicates that "de" has been made a dependent of "livre". This is indicated by block 324 in FIG. 7. The dependency structure shown in FIG. 7E can, of course, be re-written as the dependency tree shown in FIG. 7F.

Figure 8A:
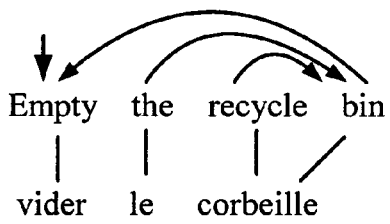
Figure 8B:
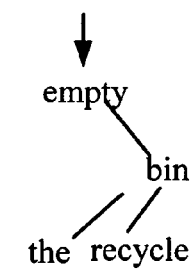

Another problem which can arise, and is addressed by the second pass of component 220 is where a plurality of source words are aligned to a single target word. Consider, for example, the source string "Empty the recycle bin". The French translation of that string is "Vider le corbeille". The word alignment for these two strings is shown in FIG. 8A, along with the dependency structure corresponding to the source language string. FIG. 8A illustrates that two source language words "recycle" and "bin" are aligned with the target language word "corbeille". The dependency tree associated with the source language string is shown in FIG. 8B.

Recall that to project dependencies from the source language dependency tree to the target language dependency tree, the word aligned with the root of the source language dependency is identified and made the root of the target language dependency tree. Therefore, the word aligned with "empty" is "vider" and is made the root of the target language dependency tree shown in FIG. 8C.

Next recall that the dependencies in the source language dependency tree are now projected onto the aligned words in target language input to obtain the target language dependency tree. However, two words are aligned with the target language word "corbeille". Therefore, component 220 must decide which dependency to project onto the target word. In accordance with one embodiment of the present invention, component 220 uses the dependency of the source word that is highest in the source language dependency tree structure. Since the two words that align with corbeille are "recycle" and "bin", FIG. 8B shows that the word "bin" is highest in the dependency tree structure and therefore its dependence will be projected onto the word "corbeille". Since bin is a post-modifier of the word "empty", the word "corbeille" will be a post-modifier of the word "vider" in the target language dependency tree.

Figure 8C:
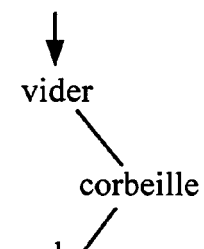
Figure 8D:
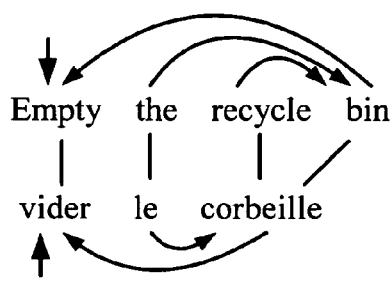
Figure 8I:
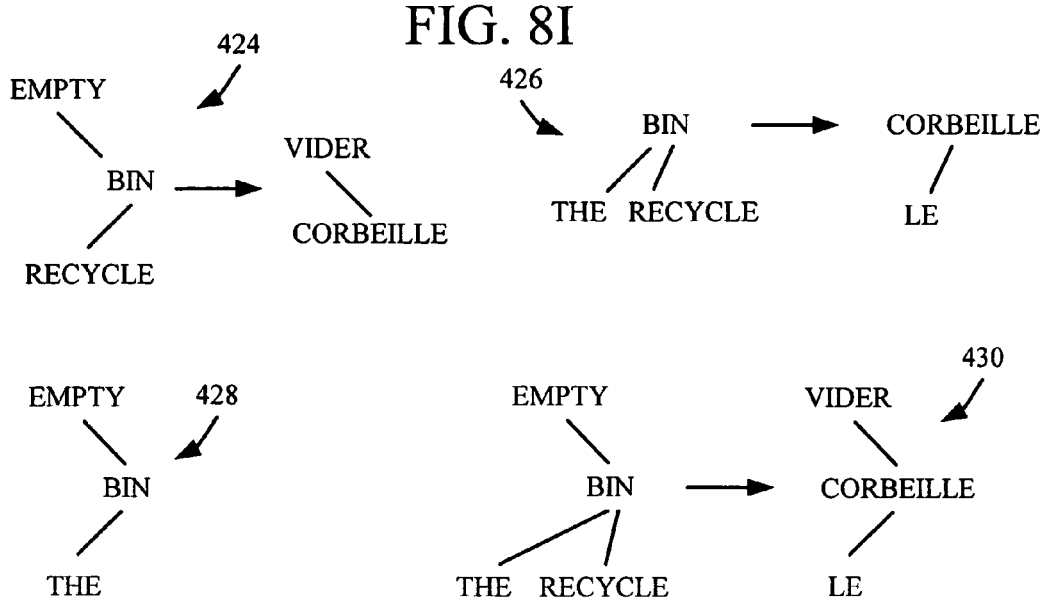

In addition, of course, "le" is projected as a pre-modifier of "corbeille" and the target language dependency tree is completed as shown in FIG. 8C. FIG. 8D illustrates both the source and target language dependency structures and the word segmented word alignment between the source and target language strings.

The structure shown in FIG. 8D can also be redrawn as shown in FIG. 8E. FIG. 8E shows both the source and target language dependency structures as dependency trees, and the word alignments are indicated by the dashed lines between the two dependency trees.

Thus, the output of dependency tree projection component 220 yields a corpus of word aligned parallel dependency tree structures (or dependency structures) such as those shown in FIG. 8D or 8E. For the present discussion, the term "dependency tree" will be used to refer to either the type of structure which shows dependencies by arcs along a word string (such as that shown in FIG. 7E) or the actual depending tree structure such as that shown in FIG. 7F. A "dependency tree" will thus refer to both of those structures interchangeably. Therefore, the term "word aligned parallel dependency trees" can be used to refer to both types of structures shown in FIGS. 8D and 8E interchangeably Other embodiments of the dependency projection tree component may use a different set of rules, heuristics or statistics than those described above.

In any case, the plurality of word aligned parallel dependency tree structures generated by component 220 is shown as the word aligned parallel dependency tree corpus 400 in the system diagram of FIG. 2. It is a corpus of structures such as those shown in FIG. 8D or 8E, or both and those structures are generated for the entire sentence-aligned parallel corpus 202.

Referring back now to FIG. 3, it can be seen that processing has advanced through the projection of source language dependencies onto aligned target language text in block 264 to obtain the word-aligned parallel dependency tree corpus 400. The next step is to extract from corpus 400 treelet translation pairs and to place them in treelet translation pair database 204. This is indicated by block 402 in FIG. 3.

Figure 8J:
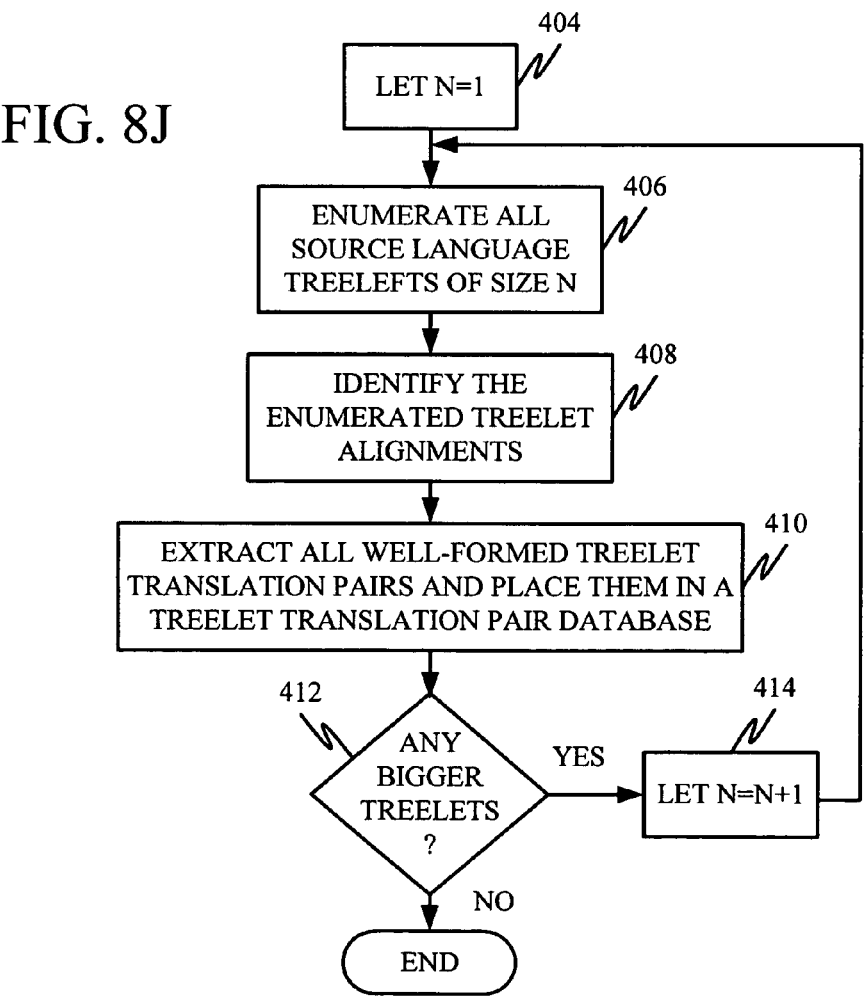
FIG. 8J is a flow diagram illustrating the extraction of treelet translation pairs.

A treelet translation pair is defined as connected subgraph of the source language dependency tree and the corresponding connected subgraph of the target language dependency tree. However, in accordance with one embodiment of the present invention, the definition of "connected subgraph" treats siblings from any node in the tree as being connected through a dummy parent node. Extraction of treelet translation pairs is performed by treelet pair extractor 224 shown in FIG. 2. Example structures indicating how this is done are shown in FIGS. 8E–8I and a flow diagram illustrating how this is done is shown in FIG. 8J.

Treelet pair extractor 224 first starts out by enumerating all source language treelets of size 1 (the size being indicated by the number of nodes contained in the treelet). This is indicated by blocks 404 and 406 in FIG. 8J. In this initial pass, where the size of the source language treelets being enumerated is 1, every node in the source language dependency tree is enumerated. For the word aligned parallel dependency tree structure shown in FIG. 8E, each of the source language nodes is enumerated on the left side of FIG. 8F.

Then, the alignments for each of the enumerated treelets are identified. This is shown on the right half of FIG. 8F, and is indicated by block 408 in FIG. 8J.

Treelet pair extractor 224 then extracts from the enumerated treelets and corresponding alignments, well-formed treelet translation pairs. This is indicated by block 410 in FIG. 8J. The treelets "empty-vider" and "the-le" are both well-formed and are thus extracted and placed in the treelet translation table. However, the entire treelet translation pair for the terms "bin" and, "recycle" is shown in FIG. 8G. Because both the single node treelet "recycle" and the single node treelet "bin" are aligned to the same target language word "corbeille", extracting either of them independently of the other would not generate a well-formed treelet translation pair. It would result in an alignment extending outside the treelet translation pair. Therefore, those two enumerated treelets of size 1 are discarded.

Extractor 224 then determines whether there are any larger treelets to be considered, as indicated by block 412. If so, then the size of the treelets to be considered is increased by 1 at block 414 and processing continues at block 406. Of course, with the present example, there are larger treelets to be considered and therefore, extractor 224 considers all treelets in the source language dependency trees of size 2.

All of the source language treelets of size 2 are enumerated in FIG. 8H. It will be noted that, because children of a node are considered to form a connected subgraph, treelet 420 is enumerated as well. This treelet considers the source language words "the" and "recycle" under a dummy root which is designated by the asterisk.

FIG. 8H shows that three of the treelets of size 2 have either the word "bin" or the word "recycle" without the other. Therefore, from the discussion of FIGS. 8F and 8G, these cannot spawn well-formed treelet translation pairs. Therefore, they are rejected. However, the source language treelet which shows "recycle" as a pre-modifier of "bin" is translated as "corbeille" and neither of the source language terms in that source language treelet have alignments which are outside of the treelet translation pair. Therefore, the treelet translation pair 422 is extracted and placed in the treelet translation pair database 204 as a well-formed treelet translation pair.

Processing again continues at block 406 where treelet pair extractor 224 enumerates all of the source language treelets of size 3. Those are indicated at 424, 426 and 428 in FIG. 8I. Treelets 424 and 426 have translations which contain all of the alignments from the source language words. Therefore, they are well-formed treelet translation pairs and are extracted and placed in the treelet translation pair database 204. Treelet 428, however, again only has the word "bin" without the word "recycle". Since "corbeille" is assigned to both "bin" and "recycle", it has an alignment which would extend outside any treelet translation pair generated using treelet 428. Therefore, treelet 428 is discarded.

Treelet pair extractor 224 then considers all source language treelets of size 4. There is only one, and it is shown at 430 in FIG. 8I. This is a well-formed treelet translation pair and it is thus extracted and placed in the treelet translation pair database 204.

Since there are no larger treelets in the corpus of source language dependency trees, treelet translation pair extractor 224 has completed extracting well-formed treelet translation pairs.

Figure 9A:
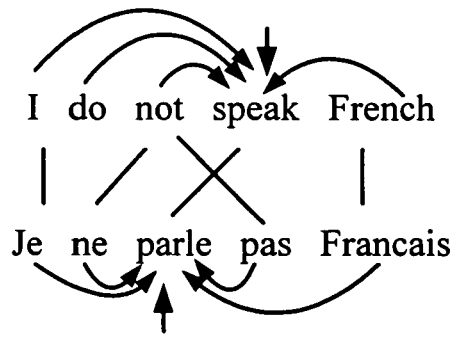
FIGS. 9A–9C illustrate extraction of treelet translation pairs from a pair of sentences in which multiple words in the target language sentence are aligned to a single word in the source language sentence.
Figure 9B:
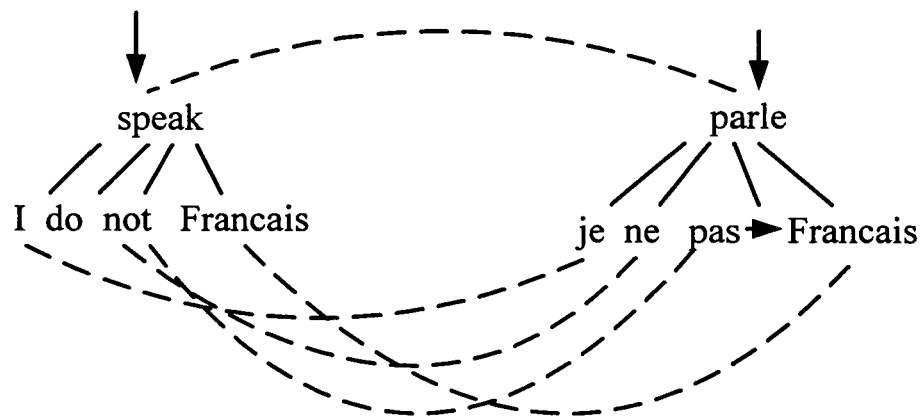
Figure 9C:
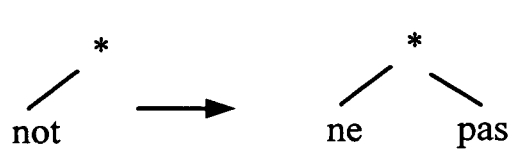

Now to better illustrate the fact that siblings of a node are considered to form a connected subgraph, consider the earlier example of the source language sentence "I do not speak French" and the corresponding French translation "Je ne parle pas Francais". The dependency structures and word alignments for those two sentences are shown in FIG. 9A. FIG. 9B shows the alternate structure indicating the same thing (dependencies and word alignments). With this example, when source language treelets of size 1 are enumerated along with their alignments, this will produce, among other treelets, that shown in FIG. 9C. This structure indicates that a treelet that has the word "not" as a pre-modifier of any source word "asterisk" can be translated as the translation of that source word "asterisk" with a pre-modifier of "ne" and a post-modifier of "pas". Thus, the treelet translation pair database will contain treelet translation pairs to indicate that "ne . . . pas" may be translated as "not".

Referring back again to the overall training system 200 shown in FIG. 2, order model training component 226 also trains an order model 206 based on the word-aligned parallel dependency tree corpus. This is indicated by block 480 shown in FIG. 3.

The problem addressed by order model 206 is that, at runtime (which is discussed later in the specification), a source language input is received and parsed into a source language dependency structure. That structure is then matched against treelets in treelet translation pair database 204. This produces a list of matching treelet translation pairs and thus a list of source language treelets. However, it will not be known, for certain, what order those treelets are to be connected together to form the target language dependency tree. Therefore, the ultimate target language surface string may not be accurate if the treelets are simply connected together in an arbitrary manner.

Thus, order model 206 is trained to generate a probabilistic prediction of the order in which the treelets are to appear in the target language dependency tree. Recall that the word-aligned parallel dependency tree corpus includes word-aligned parallel dependency trees for training data such as those shown in FIGS. 8D and 8E, and such as those shown in FIGS. 9A and 9B. The present discussion of the order model will proceed with respect to the exemplary structures shown in FIGS. 8D and 8E.

Figure 10A:
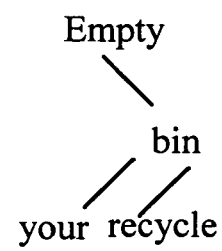
FIGS. 10A–10D illustrate how an order model is trained in accordance with one embodiment of the present invention.
Figure 10B:
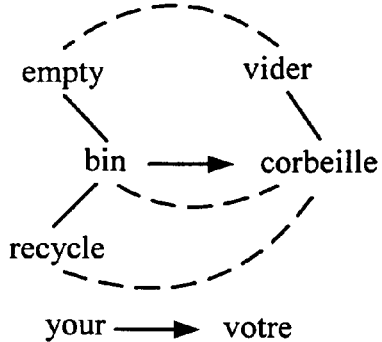

Assume that at runtime an input sentence is "Empty your recycle bin". This will first be parsed into a dependency tree such as that shown in FIG. 10A. FIG. 10B shows two illustrative treelet translation pairs which reside in treelet translation pair database 204, having been extracted by extractor 224 from the training corpus. Because the word "your" is a dependent of the word "bin" in the source language dependency tree shown in FIG. 10A, the word "votre" will depend from the word "corbeille", but there are a number of different possibilities for attaching these nodes together.

Figure 10C:
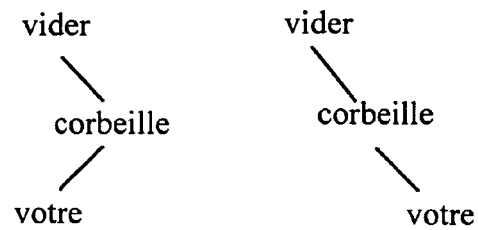

For instance, it is not known whether "votre" comes before "corbeille", or whether it comes after. The dependency tree structures showing both of these possibilities are illustrated in FIG. 10C. Order model 206 predicts the order of dependency of each level of the target language dependency tree, independently of other levels. In the present example, order model 206 will predict which dependency tree shown in FIG. 10C is more likely.

Figure 10D:

In one illustrative embodiment, order model 206 simply enumerates all possibilities, scores each, and chooses the one with the highest score. To accomplish this, order model 206 predicts the order of children, given their parent, in the dependency tree. This is done, in one embodiment by predicting an offset position from the parent. For instance, FIG. 10D illustrates the offset position of "corbeille" from "vider" and the offset position of "le" from "corbeille". "Corbeille" has the offset position of plus 1 from "vider", since it is a post-modifier (or comes after) "vider" by one position. "Le" has the offset position of minus 1 with respect to "corbeille", because it comes immediately before "corbeille". Of course, if a parent (or head) has more then one child, then the position integer may be greater than 1 for those children, if a plurality of them reside on one side of the parent. Again, order model 206 annotates the positions independently, at each level of the dependency tree.

Order model 206 provides a probability for each of the words at that level, falling in the annotated positions. Such a probability can be one such as that shown in Equation 1.

$P(\text{pos}=+1)$ given that this word=corbeille parent word=vider source word aligned to this word=bin source word aligned to parent of this word=empty Position of the source word aligned to this word=+1 part-of-speech (POS) of the word aligned to this word=Noun

POS of the word aligned to parent of this word=Verb    Equation. 1

Equation 1 shows that the order model calculates the probability of the position of the word "corbeille" being plus 1 given a variety of factors. The factors listed in Equation 1 are the word itself (corbeille), its parent, the source word aligned to this word, the source word aligned to the parent of this word, the position of the source word aligned to this word, the part-of-speech of the word aligned to this word, and the part-of-speech of the word aligned to the parent of this word.

The values of each of the listed features are shown in Equation 1 with respect to the example being discussed. Therefore, in order to train the order model, order model 206 training component 226 goes through the entire corpus 400, reading the words at each level in each dependency tree structure, filling out the features listed in Equation 1 and using that as training data to generate the probabilities. In one embodiment, the training is done using decision trees. It should also, of course, be noted that different features or additional features could be used as well. However, in any case, the order model is trained using a machine learning process and is trained to predict the best way to order target nodes in a translation dependency tree, given a source node of a source dependency tree.

In one embodiment, the model is used to predict the position of words in the input at each level, independently of the other levels in the tree. For instance, in one embodiment, the model predicts the order at each level by predicting the order for each word in turn. A probability can be predicted for each word having a given offset from its head. The model can use those factors listed in Equation 1 or different factors.

In accordance with another embodiment, order model 206 is implemented as a swap/challenge model. The swap/challenge model has some similarities to the model described above, except that it does not predict the probability of an offset but instead predicts two things separately. First, the probability that a given word will stay as a pre-modifier if the word that it was translated from (or aligned to) in the source language dependency tree was a pre-modifier (or similarly whether a target word will stay a post-modifier given that it was a post-modifier in the source sentence) versus the probability that the given word will "swap", becoming a post-modifier when the word it was translated from (or aligned to) in the source language dependency tree was a pre-modifier (or similarly whether a target word will be a pre-modifier given that it was aligned to or translated from a source word that was a post-modifier). In other words, the model will predict whether a word will stay in the same direction relative to the head, or whether it will swap relative to the head.

Then, after the swap/challenge model decides which words are to be pre-modifiers and which are to be post-modifiers for the given level in the target dependency tree, then it orders them starting from the inside (e.g., it orders pre-modifiers and post-modifiers starting with the word closest to the head). In doing so, the model begins with a pair of pre-modifiers. The model then determines whether a given one of the pair is closer or further than the other of the pair. The model iterates through all of the pre-modifiers at that level thus finding the closest, the next closest, etc. Of course, this is not predicting a position relative to a head, but is simply finding the position of each of the modifiers relative to one another.

Figure 11A:
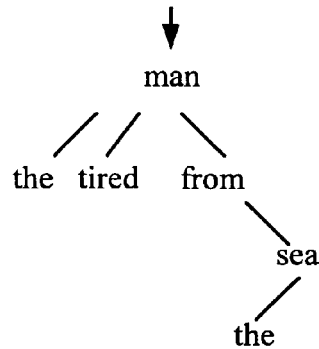
FIGS. 11A–11C illustrate the operation of a second embodiment of an order model.
Figure 11B:
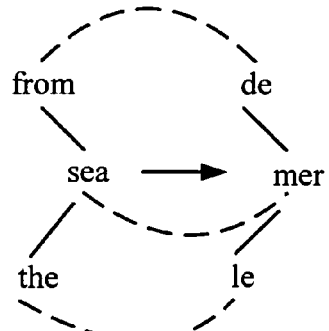
Figure 11C:
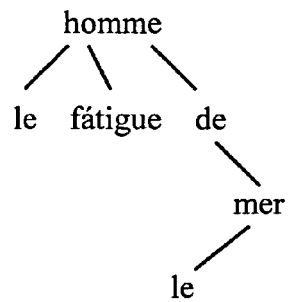

An example may be helpful. Assume an input sentence is "The tired man from the sea". A source language dependency tree structure generated for that sentence is shown in FIG. 11A. Possible matching treelet translation pairs are shown in FIG. 11B. The order model 206 is used to predict the order of the modifiers of "homme" since there are a plurality of children which immediately depend from that node, and all of which reside on the same level in the target language dependency tree. In order to obtain this ordering, the order model first predicts that the list of pre-modifiers of the node "homme" is simply "le", and the list of post-modifiers is "fatigué" and the treelet rooted at "de". In order to predict this, the order model 206 generates a probability shown in Equation 2.

$P(\text{nonswap}(le))*P(\text{swap}(Fatigué))*P(\text{nonswap}(de))$    Eq. 2

This shows that the probabilities are made up of the probability that the term "le" will not swap from its original pre-modifier position, the probability that the word "fatigué" will swap from its original pre-modifier position to a post-modifier position, and the probability that the word "de" will not swap from its original post-modifier position. For the present example, it can be seen that the order model predicts one pre-modifier and two post-modifiers on the level of the target language dependency tree currently under consideration.

Because there is only one pre-modifier, there is no need to predict where to put it relative to the head. However, there are two post-modifiers. Therefore, the order model must predict which is closest to the head. Thus, in addition to the probability shown in FIG. 2, the order model must predict "fatigué" wins a challenge with respect to the post-modifier rooted at "de" as to which is closest to the head. In order to do this, the probability shown in Equation 3 is computed.

P(challenge(fatigué)=win)|same features as in Eq. 1.   Equation. 3

Thus, Equation 3 calculates the probability that the term "fatigué" will win a challenge with respect to the remaining post modifiers given a variety of features. In one illustrative embodiment, the features considered when generating this probability are the same as those illustrated in Equation 1. Therefore, when the swap/challenge model is used in order model 206, training component 226 goes through the entire training corpus and calculates these probabilities, given the listed features as training data. Each dependency tree is descended, looking at each level independently, in order to calculate these probabilities.

Referring again to the overall operation of the training system 200, as illustrated in FIGS. 2 and 3, agreement model training component 228 also accesses corpus 400 to train agreement model 208. This is indicated by block 482 in FIG. 3. Agreement model training component 228 accesses all of the target language dependency trees in corpus 400. The agreement model 208 attempts to predict each child given its head. These are predicted, regardless of the order of the children. In order to train agreement model 208, a standard language model framework is used. However, instead of training the model to predict some word given some number of previous words in a string, component 228 descends each of the target language dependency trees and trains the model to predict a child given its parent.

One benefit associated with the agreement model 208 is that a score can be obtained for a treelet, even if the modifiers have not been ordered in the tree. Also, agreement model 208 does not consider the number of words between the modifier and the word it modifies. All that is considered is that it is a dependent of a parent and thus modifies the parent. This can be advantageous over surface string language models. For instance, consider a bi-gram language model: if the modifier and modified word are separated by more than two words, then the modifier will not even be considered by the language model in predicting the modified word.

Referring again to the overall training system diagram shown in FIG. 2, the translation probability table 210 is simply a conventional channel model which predicts the probability of a word in a source language being translated to a word in a target language.

Finally, target language model training component 222 accesses the word segmented target strings in corpus 256 generated by target language word segmentation component 216 and trains a target language model. This is indicated by block 484 in FIG. 3 and is shown as target language model 212 in FIG. 2. Training component 222 uses conventional language model training techniques to train an n-gram language model in the target language. In a conventional n-gram model, the probability of word is predicted given the n−1 preceding words. The probability of an entire sentence is the n-gram probability of each word in that sentence multiplied together.

Figure 12:
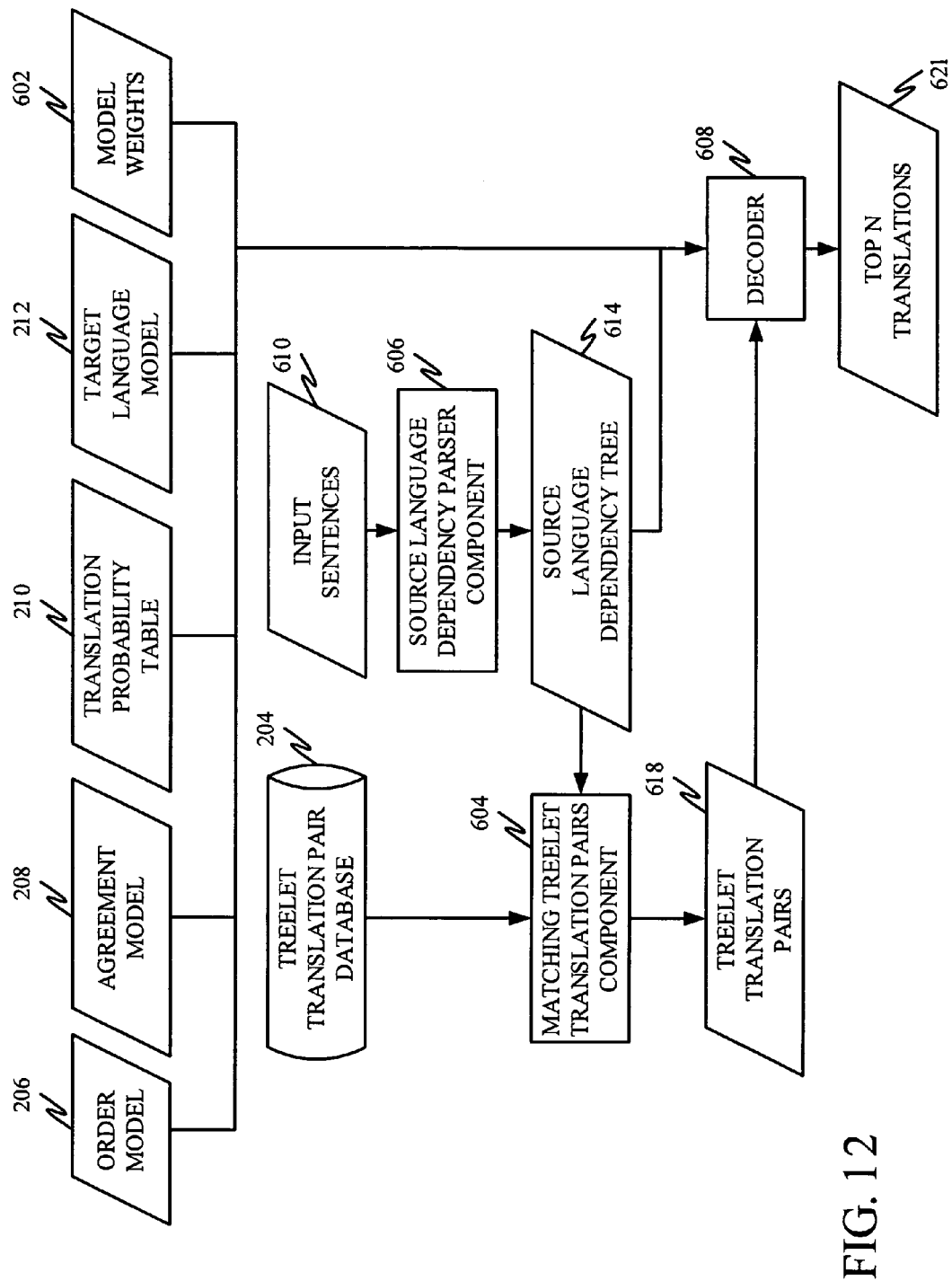
FIG. 12 is a block diagram illustrating a runtime environment in accordance with one embodiment of the present invention.

Thus, at this point, the full set of models shown in FIG. 2 have now been trained, along with the treelet translation pair database 204. These models can now be used by a translation decoder in order to generate runtime translations for input text fragments. FIG. 12 is a block diagram illustrating a translation system 600 in accordance with one embodiment of the present invention. Translation system 600 has access to the statistical models 206, 208, 210, and 212 along with a set of model weights 602. System 600 also has access to treelet translation pair database 204.

Figure 13:
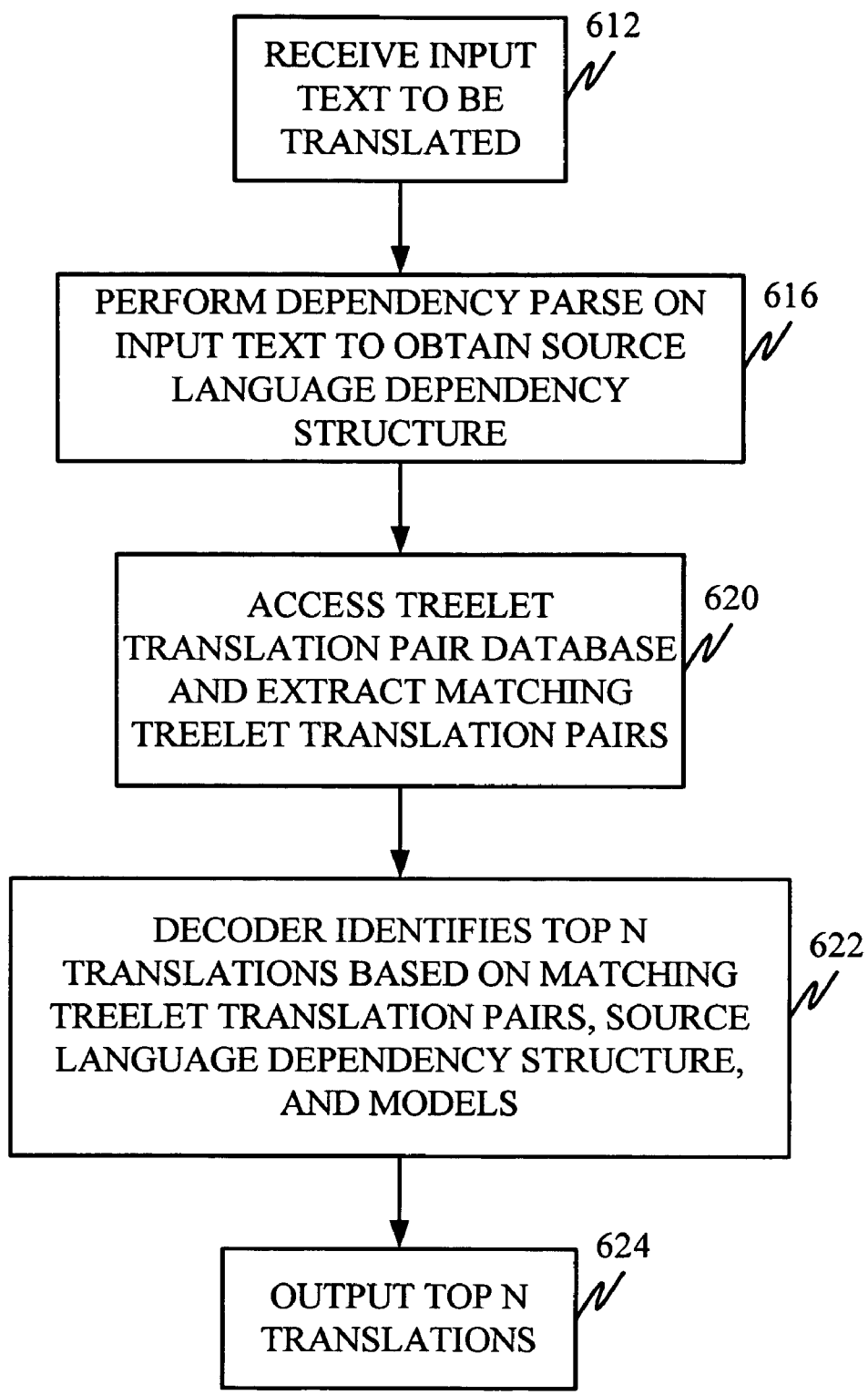
FIG. 13 is a flow diagram illustrating the overall operation of the runtime environment shown in FIG. 12.

System 600 includes matching treelet translation pair component 604, source language dependency parser 606 (which can be the same as source language dependency parser component 214 shown in FIG. 2) and decoder 608. The overall operation of system 600 shown in FIG. 12 is illustrated by a flow diagram illustrated in FIG. 13.

System 600 first receives an input sentence (or other text fragment) 610. This is indicated by block 612 in FIG. 13. Dependency parser component 606 parses this source-input sentence 610 into a source language dependency tree. Assume for the sake of example that the input text segment is "the files installed on your computer." Component 606 generates a source language dependency tree 614 such as that shown in FIG. 14A. Performing the dependency parse on the input text is illustrated by block 616 in FIG. 13.

Matching treelet translation pairs component 604 receives source language dependency tree 614 and accesses treelet translation pair database 204. Component 604 extracts all matching treelet translation pairs from database 204 (those that match treelets in the source language dependency tree 614) and provides the treelet translation pairs as an output 618. The step of extracting the matching treelet translation pairs is indicated by block 620 in FIG. 13.

Decoder 608 receives the source language dependency tree 614 and the matching treelet translation pairs 618 and generates translation tree hypotheses and scores each with the models 206, 208, 210, and 212 as weighted by model weights 602 and outputs the top N translations 621. This step is indicated by blocks 622 and 624 in FIG. 13.

Figure 14A:
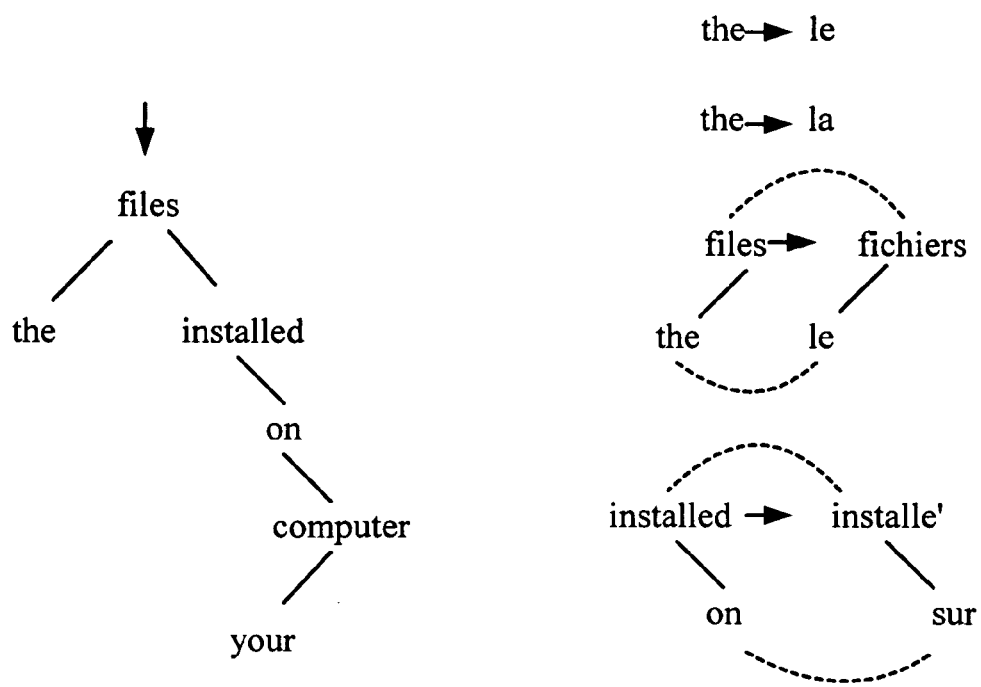
FIGS. 14A–14C illustrate the operation of a dynamic programming decoder in accordance with one embodiment of the present invention.
Figure 14B:
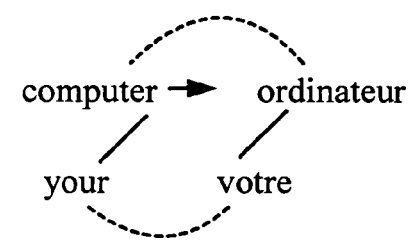

To follow through on the example, in which the source language input text 610 is "the files installed on your computer", source language dependency parser component 606 generates source language dependency tree 614, as shown in FIG. 14A. Matching treelet translation pairs component 604 then extracts treelets from treelet translation pair database 204 that have source language treelets which match treelets in the source language dependency tree 614. Assume, for example, that the treelet translation pairs extracted by component 604 and generated as output 618 are those shown in FIG. 14B (the list of pairs in FIG. 14B has been shortened for clarity of illustration. In reality even a short sentence such as this is likely to have dozens of matching treelet translation pairs). The job of decoder 608 is now to find the best combination and ordering of the treelet translation pairs in FIG. 14B in order to cover the source language dependency tree 614 and to generate a target language dependency tree.

In one illustrative embodiment, decoder 608 is a dynamic programming decoder. In that embodiment, decoder 608 performs an exhaustive decoding search. One example of pseudocode that illustrates this is shown in table 1.

TABLE 1

```
ALGORITHM 1 Exhaustive decoding algorithm
Function GetNBestTranslation(i:input node)
    L←0; a sorted list of translations
    for all treelet pairs p rooted at i do
        R←roots of input subtrees not covered by p
        for all r ∈ R do
            let x[r] ← GetNBestTranslations(r)
        end for
        for all sets of translations Q,
            one from x[r] for each r ∈ R do
```

TABLE 1-continued

```
            for all order attachments Q' of Q
                  into the target side of p do
              T ← target subtree interleaving Q'
                  into the target side of p
              score T according to models
              add T to L in order
            end for
       end for
    end for
    return the n-best list L
 end function
```

Figure 14C:
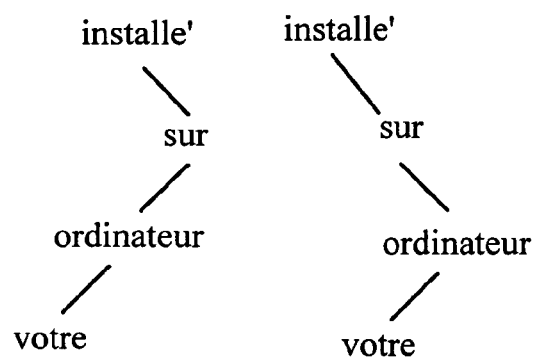
Figure 14D:
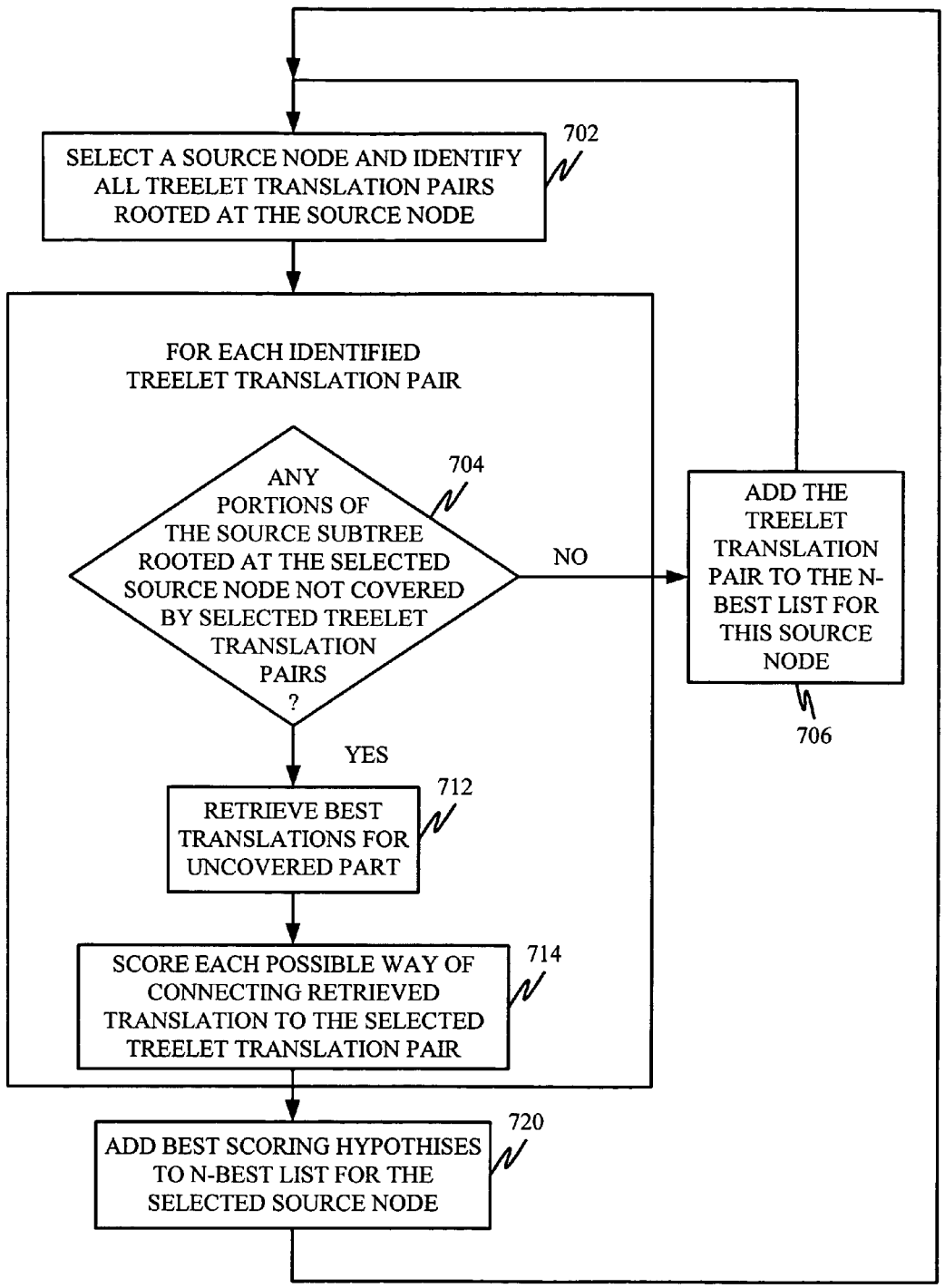
FIG. 14D is a flow diagram illustrating operation of a decoder in accordance with one embodiment of the present invention.

A flow diagram illustrating one embodiment of the same exhaustive search is illustrated by the flow diagram shown in FIG. 14D which will now be discussed. The decoder 608 starts by looking at each source node separately in a bottom-up manner and attempts to find the best translation for the whole sub-tree rooted at that source node. The decoder 608 climbs up the tree, re-using computations from previously computed sub-trees until it encounters the root of the source tree. Once the root has been encountered, the decoder 608 will have found a best translation for the entire text fragment represented by that source tree.

Specifically, decoder 608 first selects the lowest source node and identifies all treelet translation pairs rooted at that source node. In the example shown in FIG. 14A, decoder 608 starts with source node "your." However, there are no treelet translation pairs in FIG. 14B which are rooted at the node "your." Therefore, the decoder simply moves up to the next level and analyzes the node "computer." Decoder 608 locates matching treelet translation pair 700 shown in FIG. 14B as having a source sub-tree rooted at the node "computer." Selecting the source node and identifying all treelet translation pairs rooted at that source node is indicated by block 702 in FIG. 14D.

Then, for each identified treelet translation pair (in this case there is only one—pair 700) decoder 608 determines whether any portions of the source sub-tree rooted at the selected source node (i.e., rooted at "computer") are not covered by the selected treelet translation pair (i.e., by treelet translation pair 700). This is indicated by block 704 in FIG. 14D. In the present example, treelet translation pair 700 is the only one identified and it covers the entire sub-tree rooted at "computer." Therefore, it is simply scored and added to the N-best list for the source node "computer." This is indicated by block 706 in FIG. 14D.

Decoder 608 then selects another source node, moving up the tree. The next source node is "on" and there are no matching treelet translation pairs in FIG. 14B which are rooted at the node "on." Therefore, decoder 608 simply moves up to the next source node "installed." Again, at block 702, decoder 608 locates, in the list shown in FIG. 14B treelet translation pair 710 which is rooted at the node "installed."

At block 704, decoder 608 determines that the treelet translation pair 710 does not cover the part of the source subtree from "computer" and below. Since decoder 608 is moving up the tree, any uncovered sub-tree portions further down on the tree will already have a score computed for them. Therefore, decoder 608 retrieves the best translations for the uncovered part of the sub-tree root at "installed." In this case, it retrieves the best translations for the sub-tree rooted at "computer." This is indicated by block 712 in FIG. 14D. The retrieved best translation pairs will include translation pair 700.

Now, decoder 608 must determine how to connect the target language portion of translation pair 700 onto the target language portion of translation pair 710. Decoder 608 determines that "ordinateur" is hooked onto "sur" because the word alignments show that "on" is translated as "sur" and "ordinateur" is translated as "computer." Therefore, "ordinateur" must depend on "sur" based on the dependency in the source language dependency tree shown in FIG. 14A. However, decoder 608 simply does not know if "ordinateur" is a pre-modifier or a post-modifier of "sur."

In one illustrative embodiment, decoder 608 enumerates all possible ways to connect the two sub-trees and scores each possible way with the complete set of models (or all those that apply) to determine the most likely way of connecting the two. This is indicated by block 714 in FIG. 14D. The two possibilities are shown in FIG. 14C. Equation 4 indicates one illustrative way of combining the scores of each of the models to obtain an overall score for each hypothesis.

$$\text{Score} = \lambda_1 \log(\text{channel model probability}) + \lambda_2 \log(\text{order model probability}) + \lambda_3 \log(\text{agreement model probability}) + \lambda_4 \log(\text{target } LM \text{ probability}) \qquad \text{Eq. 4}$$

The channel model probability will be the probability of "installe sur" being translated as "installed on", multiplied by the probability of "votre ordinateur" being translated as "your computer." The order model probability of the first possible order in FIG. 14C will be the probability that "sur" is a post-modifier of "installe" in position +1 multiplied by the probability that "ordinateur" is a pre-modifier of "sur" in position −1. The order model probability of the second possible order in FIG. 14C will be the probability that "sur" is a post-modifier of "installe" in position +1 multiplied by the probability that "ordinateur" is a post-modifier of "sur" in position +1. The agreement model probability will be the probability of "sur" being a child of "installe" multiplied by the probability of "ordinateur" being a child of "sur" and the probability of "votre" being a child of "ordinateur." Finally, the target language model probability will simply be the string-based probability of the target language surface string read off of each of the leaves of the hypothesis target language dependency trees, which is "installe votre ordinateur sur" for the first possibility and "installe sur votre ordinateur" for the second possibility.

The decoder 608 constructs all hypotheses at the node under consideration, scores each hypothesis with all of the models, applying the weights associated with each model, and summing them to obtain a single score for each hypothesis at this node. The top N-best scoring hypotheses are placed on the N-best list for this selected source node. This is indicated by block 720 in FIG. 14D.

This process is continued until decoder 608 traverses the entire source language dependency tree to its root, and the N-best translations are then output, as desired.

Of course, a number of optimizations can be performed to enhance efficiency. For instance, instead of keeping the full list of translation candidates for each source node, only the top-scoring subset of candidates may be maintained.

In addition, in order to limit the number of ordering operations conducted by decoder 608, decoder 608 can check to see if a given word-set has been previously ordered by the decoder prior to beginning the ordering process. In one embodiment, this can be implemented in a hash table indexed on unordered tress. Two trees are considered to be equal if they have the same tree structure and lexical choices after sorting each parent's children into a canonical order.

Another way of restricting the search space is to drop candidates early in the decoding process, and this may be done before the relatively large and expensive ordering space is explored. For instance, one way to prune candidates early is to examine channel model scores of the unordered treelet along with the completed scores of the child sub-trees to be attached when creating the final translation. If the sum of these scores is lower than the lowest score currently in the N-best list, then the final candidate is bound to fall off the N-best list, since adding the order model probability will only drop the overall score.

It has been observed that the ordering stage is the most expensive step for decoder 608 in terms of complexity and time. Its complexity grows with the factorial of the number of nodes to be ordered. It is also called for each possible combination of translation choices. Therefore, in one illustrative embodiment, a greedy ordering strategy is employed instead of the exhaustive ordering step described above. The complexity of greedy ordering is linear in the number of children at any given node. Given a fixed pre and post modifier count, the order model is capable of evaluating a single ordering decision independently from other ordering decisions. In decoding, then, the step that considers all possible orderings in the algorithm shown in table 1 is replaced with the algorithm shown in table 2.

TABLE 2

```
Algorithm 2 Greedy ordering algorithm
    Order{best} : empty ordering with 0 probability.
    for each possible count of pre- and post-modifiers
        for each premodifer position from right to left
            for each unordered node
                Evaluate this unordered node in this position
            end for
            Place the highest scoring unordered node
                in this position
            Remove that node from the unordered pool
        end for
        for each postmodifier position from left to right
            for each unordered node
                Evaluate this unordered node in this position
            end for
            Place the highest scoring unordered node
                in this position
            Remove that node from the unordered pool
        end for
        if this ordering has higher score than O_{best}
            Order{best} := this ordering
        end if
    end for
    return Order{best}
```

This "greedy ordering" only exposes a very small subset of all possible orderings. While this is significantly faster, it does not always produce the best orderings.

In another embodiment, the decoder 608 is made significantly faster by reducing the number of translation combinations that need to be attempted. The number of translations using a given treelet translation pair is exponential in the number of sub-trees of the input not covered by that treelet pair. One solution is to provide variable-sized N-best lists. This means that a recursive call to translate an uncovered sub-tree will limit the size of the returned N-best list according to the number of uncovered sub-trees in the current treelet. If a treelet covers very little of the tree, and will require several recursive calls, then those calls return smaller N-best lists. This way, the treelet pairs that are most vulnerable to exponential blow-up will artificially lower the value of the exponent. This also allows the decoder to thoroughly explore those treelet pairs that are likely to result in good translations—that is, those treelet pairs that already translate a lot of the tree.

In one illustrative embodiment, the value of N in the N-best list is determined by dividing a seed value by the number of uncovered nodes that need to be resolved using recursive calls. The number is then rounded up so that no treelet pairs will ever get an effective N value of one. It has been found that the number 12 makes a relatively good seed value as it results in a progression that falls off quickly, but still differentiates between interesting cases. In one embodiment, it has been found that use of variable-size N-best lists has made it possible for the exhaustive decoder to outperform the greedy decoder.

It has also been found that channel model scores and treelet size are powerful predictors of high quality translation. Pruning away low scoring treelet translation pairs before the search starts allows the decoder to spend more time inspecting combinations and orderings of high quality treelet pairs. A number of heuristics can be used to prune, and those include:

1. Only keeping those treelet translation pairs with a maximum likelihood estimation probability above some threshold. A cutoff of 0.01 is believed to be useful.

2. Given a set of treelet translation pairs where the source treelets are identical, only keep those pairs whose maximum likelihood estimation probability is within some ratio of the best pair. For instance, only treelet pairs whose maximum likelihood estimation probability is no less than one-twentieth of the best maximum likelihood estimation probability are kept.

3. Keep only the top N treelet translation pairs with the same input node, as ranked first by size, then by maximum likelihood estimation channel model score, then by another model score. The thresholds N=3 to 5 have been observed to work well.

In accordance with another embodiment of the present invention, decoder 608 is not implemented as a dynamic programming decoder, but is instead implemented using the A * search. The A * search technique is well known and one exemplary discussion of it is set out in Och et al., *AN EFFICIENT A * SEARCH ALGORITHM FOR STATISTICAL MACHINE TRANSLATION*, in ACL 2001: Data-Driven Machine Translation Workshop, Toulouse France, pp. 55–62 (July 2001).

In performing an A * search, it is well known that translation candidates will have an actual score for parts which have actually been decoded, and an estimated score for the remainder of the candidate which has yet to be translated. The estimated scores are optimistic such that once a candidate has been completed, the decoder can perform fairly severe pruning. In other words, if one candidate is actually completed, then any incomplete candidates that have actual scores plus estimated scores that total less than the actual score for the completed candidate can be discarded. This is because the actual score for that incomplete candidate, once it is completed, is guaranteed to be less than or equal to its optimistic estimated score, and hence less than that of the already completed candidate.

In one embodiment of the present invention, the A * decoder is not searching the input dependency tree from bottom up, or top down. Instead, it is searching the space of treelet mappings (or matching treelet translation pairs 618) extracted by component 604 from treelet translation pair database 204 and identified as matching portions of the source language dependency tree 614 created by component 606 from input 610. The A * decoder, for instance, will consider each treelet translation pair shown in FIG. 14B and make a binary decision, whether to chose that translation pair or not. Each such decision represents a branch in the search space.

To compute the actual score for each candidate chosen by the A* decoder, the decoder scores the part of the source dependency tree that is covered by the selected treelet translation pair. The estimated part of the score for each candidate is calculated by applying the applicable models to all of the treelet translation pairs that might possibly apply to the uncovered portion of the source language dependency tree. The highest score is used as the estimated score, for that model, for that candidate.

For instance, when applying the agreement model to a candidate, the estimated agreement model score for that candidate is derived by going through all of the listed treelet translation pairs 618 that could cover the uncovered part of the source language dependency tree and computing an agreement model score for all possible combinations of those treelet translation pairs. The highest score is picked as the optimistic estimate for the agreement model portion of the estimated score for that candidate. This is repeated for that candidate, for each applicable model, to derive the entire estimated score for that candidate.

By applicable model, it is meant those models for which a score could be applied. For instance, the order model score for a node cannot be calculated until translations for its child nodes have been selected and the order of those children has been determined. Similarly, the target language model can only apply once a complete candidate has been obtained such that the surface string can be read off of the dependency tree. Therefore, the actual and estimated portions of the score for each candidate will illustratively only be derived based on the channel model and agreement model.

It will be appreciated that this type of A* search allows candidates to include overlapping trees, so long as the trees are not inconsistent with one another. In other words, two treelet translation pairs that overlap on one or more nodes, will be considered, so long as those nodes are not inconsistent.

To describe the A* search with more specificity, we begin by assembling all treelet translations into a single, global list, which is then sorted by one or more of several desirability criteria. This may be, for instance, treelet size or channel model score. A queue is then initialized of incomplete candidates and another queue of complete candidates. Each candidate includes the following members:

1. The position of the next treelet translation to consider in the global list of matching treelet translation pairs.
2. The set of treelet translations already selected in this candidate.
3. A representation of the input nodes covered by this candidate.
4. The actual and optimistic estimate portions for the scores for each candidate according to each model.

At each step, the highest scoring candidate is extracted from the incomplete queue. The next treelet translation is considered in the global list as indicated by a next treelet pair pointer in each candidate. If there are no more treelet pairs, the candidate is dropped.

If the next treelet translation is not compatible, as described in greater detail below, with the treelet translations already chosen for this candidate, it is skipped and the next one is considered. Similarly, if the treelet is compatible but adds no new information (i.e., it does not cover any new input nodes) to the already chosen treelets, it is also skipped.

If the treelet translation is compatible and covers new nodes, then the candidate is copied, creating a new candidate and the new treelet translation is added to the previously chosen set of treelets, the actual model scores are added for the newly covered input nodes, and the optimistic estimates for those nodes are subtracted. The new score may be subjected to one or more threshold tests and the candidate is discarded if it fails any of them. One example of a threshold test is if the candidate score is less than the lowest scoring candidate in the completed candidates queue, it can be discarded. If it passes the threshold tests but does not yet cover the entire input, it is placed back in the incomplete queue.

If the new candidate now covers the entire input, the overlapping treelets are merged and all possible orderings that are consistent with the selected treelets are explored. For each ordering an order model and target model score is computed. The ordering that produces the highest combined order and target score is chosen. At this point, the candidate score includes no estimates, but instead the actual scores for all models, including the order and target models. The completed candidate is then placed in the completed queue.

Meanwhile, the original candidate represents the "not chosen" branch in the search space. Its next treelet pair pointer is updated as is its estimated score to reflect the choices not taken. This has the effect of tightening up the estimate with each not-taken choice with no loss in the optimality of the search. The tighter estimates result in better pruning and hence a faster search. The updated score is subjected to one or more threshold tests and the candidate is discarded if it fails any of them, and otherwise it is inserted back into the incomplete queue based on its updated score.

The process repeats until the incomplete queue is empty, or a specified amount of effort on the search has been expanded.

In accordance with one embodiment of the present invention, the notion of compatibility of treelets is extended to allow some sorts of overlapping treelets. Consider an input sentence "Click the selected button." Assume we have translations for "click button" and "selected button" that agree on the translation of "button." It would likely be detrimental to force a choice between these two translations, instead of allowing their translational preferences to mutually reinforce one another.

Note, however, that treelet translations may provide one-to-one, one-to-many, many-to-one, or many-to-many translations and/or insertion or deletion of words. In one illustrative embodiment, the treelets retain node-level alignment information from training time. Each treelet translation is divided into a disjoint set of paired source and target minimal translation units (MTUs), where each MTU corresponds to the minimum unit of alignment. Therefore, word insertion and deletion are modeled as one-to-many and many-to-one translations respectively. Additionally, since treelets are ordered, each treelet node implies a partial ordering among its children. Therefore, two treelet translations are considered to be compatible if, on portions of the input where they overlap, they agree on both the boundaries and the content of the MTUs, and furthermore, for each target node in the overlap, there exists a total ordering of child nodes that respects the partial ordering implied by each treelet translation.

One additional item should be considered in accordance with one embodiment of the present invention, and that is training the values for model weights 602 which are applied in the log-linear framework to the model scores. A metric, commonly referred to as, the BLEU score, is an automatically generated score that attempts to evaluate how well a decoder has translated a body of sentences according to some reference translations. A well-known technique referred to as maximum BLEU training can be used as a specific way to train the weights for log-linear model combination.

At a relatively high level, the maximum BLEU algorithm operates much like any multi-dimensional function optimization approach. A direction is selected and the objective function is maximized along that direction using a line search. This is repeated until no further improvement to the objective function is produced. In one prior art system, Och, *MINIMUM ERROR RATE TRAINING AND STATISTICAL MACHINE TRANSLATION*, in Proceedings of the ACL (2003) a method is described for optimizing an objective function directly (such as the BLEU score). This method requires the translation system to generate an N-best list for any input sentence, a set of continuously valued model scores for each translation and some objective function.

Generally, it performs like a sequential optimization. For instance, assume that there are only two models in the decoder, each having a weight $\lambda_1$ and $\lambda_2$. The above mentioned reference operates by holding one of the weights steady and optimizing along all values of the other weight, and then picking an optimum weight.

Figure 15:
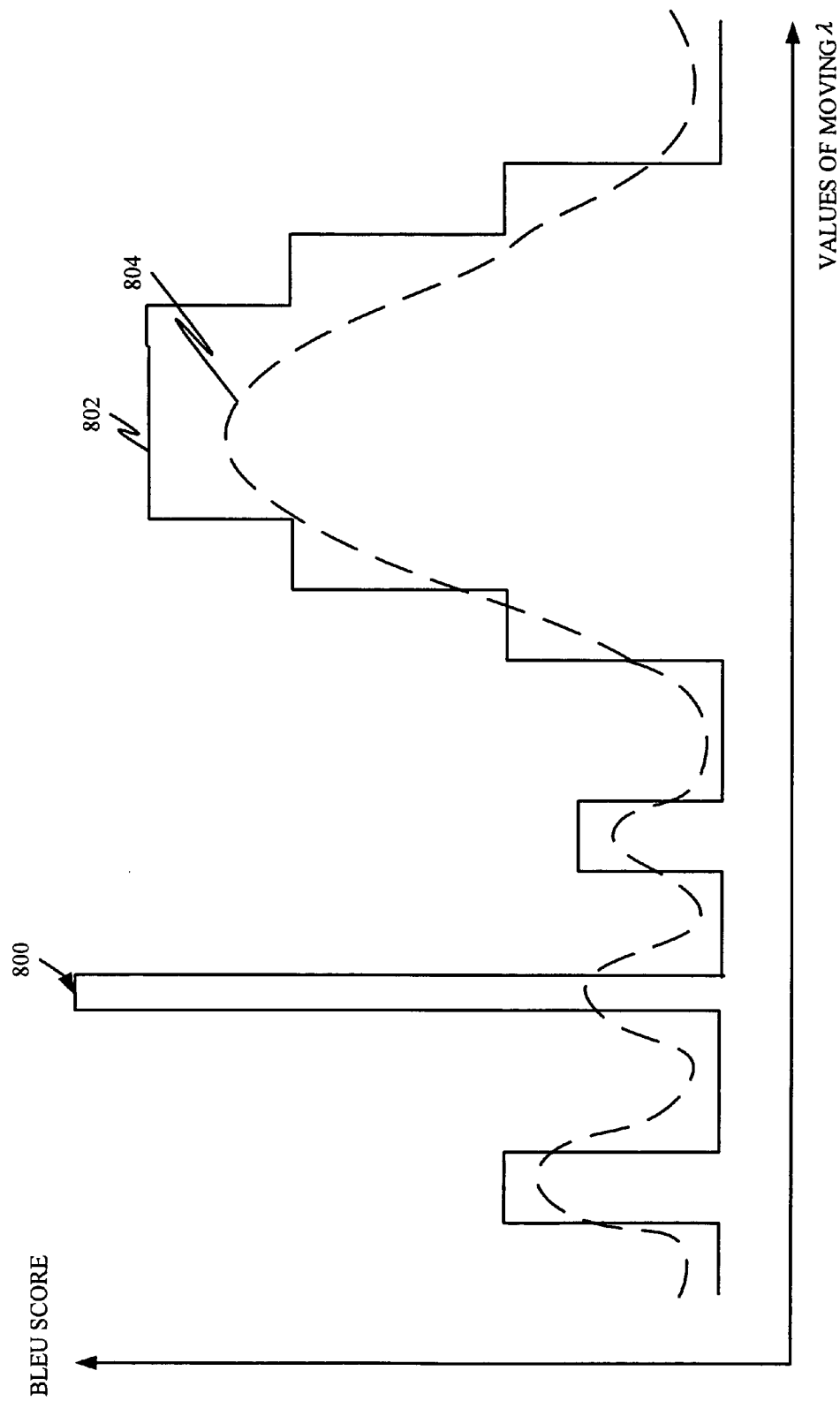
FIG. 15 illustrates how model weights are trained in accordance with one embodiment of the present invention.

One problem with this approach is that, in looking at the BLEU scores along one particular direction, in practice one obtains a stepwise function such as the solid line shown in FIG. 15. This solid line shows that for a particular very narrow range of $\lambda$'s, the BLEU score is the highest at a $\lambda$ value designated by number 800. However, if the weight were chosen at the corresponding value for the peak 800, this would be a relatively unstable system, because the peak is so narrow. The peak 800 may simply indicate that a single sentence performed very well using that weight. However, there is a much broader peak 802 which has a BLEU score that is not quite as high as that at peak 800, but yet would tend to indicate that a whole range of sentences performed much better at that value of $\lambda$.

Therefore, in setting the model weights, in accordance with one embodiment of the present invention, instead of simply considering the raw BLEU weights as indicated by the solid line in FIG. 15, the present invention uses a moving average, of the BLEU scores as indicated by the dashed line in FIG. 15. By using a moving average, where the averaging window includes a plurality of scores, then the result is the dashed line in FIG. 15. This takes into account not only the height of the peaks of the step-wise function but also their width. Thus, when looking at the moving average of the BLEU scores, the value of $\lambda$ will be set much more closely to the value associated with the broad peak 802 of the step function, yielding a more stable system.

Although the present invention has been described with reference to particular embodiments, workers skilled in the art will recognize that changes may be made in form and detail without departing from the spirit and scope of the invention.

What is claimed is:

1. A method for generating a target language dependency structure, the method comprising:
    accessing a training data corpus having a plurality of pairs of parallel text fragments, each pair of parallel text fragments comprising a source language text fragment and a corresponding target language text fragment;
    obtaining an aligned structure in which lexical items in a source language dependency structure, generated based on a source language text fragment, are aligned with lexical items in a corresponding target language text fragment; and
    projecting dependencies from lexical items in the source language dependency structure to lexical items in the target language text fragment to obtain the target language dependency structure, wherein the target language dependency structure comprises a target language dependency tree and wherein the dependency projection component is configured to re-adjust the target language dependency structure by identifying a node in the target language dependency tree that is out of order, and re-attaching the identified node at a lowest level in the target language dependency tree that yields a target language string with lexical items in the same order that they appear in the target language text fragment.

2. The method of claim 1 wherein projecting dependencies comprises:
    determining whether the target language dependency structure is properly indicative of the target language text fragment; and
    if not, adjusting the target language dependency structure so it is properly indicative of the target language text fragment.

3. The method of claim 2 wherein determining comprises:
    reading the target language dependency structure to generate a target language text string; and
    determining whether the lexical items in the target language text string are in a different order than they appear in the target language text fragment.

4. The method of claim 3 wherein adjusting the target language dependency structure comprises:
    re-arranging the target language dependency structure until lexical items in the target language text string read from the target language dependency structure are the same order that they appear in the target language text fragment.

5. The method of claim 1 wherein obtaining an aligned structure comprises:
    parsing the source language text fragment to obtain a source language dependency structure;
    segmenting the corresponding target language text fragment into lexical items; and
    aligning lexical items in the source language dependency structure with lexical items in the target language text fragment.

6. The method of claim 5 wherein projecting comprises:
    when a lexical item in the source language dependency structure is not aligned with a lexical item in the target language text fragment, then projecting no dependency from the unaligned lexical item in the source language dependency structure to the target language text fragment.

7. The method of claim 1 wherein a dependency in the source language dependency structure is between first and second source lexical items in the source language dependency structure and the first and second source lexical items are aligned with first and second target lexical items in the target language text fragment, respectively, and wherein projecting comprises:
    assigning the dependency between the first and second source lexical items to the first and second target lexical items.

8. The method of claim 1 wherein a lexical item in the source language dependency structure is aligned with a plurality of lexical items in the target language text fragment, and wherein projecting comprises:
identifying a parent node for the plurality of lexical items in the target language dependency structure;
identifying a right-most one of the plurality of lexical items in the target language text fragment;
assigning the right-most lexical item as dependent from the parent node; and
assigning a remainder of the plurality of lexical items in the target language text fragment as dependent from the right-most lexical item.

9. The method of claim 1 wherein an unaligned lexical item in the target language text fragment is unaligned to a lexical item in the source language dependency structure, and wherein projecting comprises:
identifying a lexical item located proximate the unaligned lexical item in the target language text fragment; and
assigning the unaligned lexical item as dependent from the identified lexical item.

10. The method of claim 9 wherein identifying comprises:
identifying one lexical item, of a set of target language lexical items adjacent the unaligned lexical item in the target language text fragment, that is lowest on the target language dependency structure; and
assigning the unaligned lexical item as dependent from the identified lexical item.

11. The method of claim 1 and further comprising:
using at least a portion of the target language dependency structure in a machine translation system to translate a source language input into a target language output.

12. The method of claim 1, wherein, when a plurality of lexical items in the source language dependency structure are aligied with one lexical item in the target language text fragment, then projecting comprises:
identifying one of the plurality of lexical items in the source language dependency structure that is highest in the source language dependency structure; and
assigning a dependency associated with the identified one of the plurality of items in the source language dependency structure to the one lexical item in the target language text fragment.

13. A system for generating a target language dependency structure, the system comprising:
a corpus processing system configured to obtain an aligned structure in which lexical items in a source language dependency structure, indicative of a source language training data text fragment, are aligned with lexical items in a corresponding training data target language text fragment that is a translation of the source language text fragment; and
a dependency projection component configured to project dependencies from lexical items in the source language dependency structure to the lexical items in the target language text fragment to obtain the target language dependency structure, wherein the target language dependency structure comprises a target language dependency tree and wherein the dependency projection component is configured to re-adjust the target language dependency structure by identifying a node in the target language dependency tree that is out of order, and re-attaching the identified node at a lowest level in the target language dependency tree that yields a target language string with lexical items in the same order that they appear in the target language text fragment.

14. The system of claim 13 and further comprising:
a training data corpus having a plurality of pairs of parallel text fragments, each pair of parallel text fragments comprising a source language text fragment and a corresponding target language text fragment.

15. The system of claim 13 wherein the dependency projection component is configured to determine whether the target language dependency structure is properly indicative of the target language text fragment, and if not, adjust the target language dependency structure so it is properly indicative of the target language text fragment.

16. The system of claim 15 wherein the dependency projection component is configured to determine whether the target language dependency structure is properly indicative of the target language text fragment by reading the target language dependency structure to generate a target language text string, and determine whether the lexical items in the target language text string are in a different order than they appear in the target language text fragment.

17. The system of claim 16 wherein the dependency projection component is configured to adjust the target language dependency structure by re-arranging the target language dependency structure until lexical items in the target language text string read from the target language dependency structure are the same order that they appear in the target language text fragment.

18. The system of claim 13 wherein the corpus processing system comprises:
a parser configured to parse the source language text fragment to obtain a source language dependency structure.

19. The system of claim 13 wherein the corpus processing system comprises:
a segmenter configured to segment target language text fragments into lexical items.

20. The system of claim 13 wherein the corpus processing system comprises:
an alignment component configured to align lexical items in the source language dependency structure with lexical items in the target language text fragment.

21. A computer readable medium storing computer readable instructions which, when executed by a computer, cause a computer to perform a method for generating a target language dependency structure, the method comprising:
accessing a training data corpus having a plurality of pairs of parallel text fragments, each pair of parallel text fragments comprising a source language text fragment and a corresponding target language text fragment;
obtaining an aligned structure in which lexical items in a source language dependency structure, generated based on a source language text fragment, are aligned with lexical items in a corresponding target language text fragment; and
projecting dependencies from lexical items in the source language dependency structure to the aligned lexical items in the target language text fragment to obtain the target language dependency structure, wherein a lexical item in the source language dependency structure is aligned with a plurality of lexical items in the target language text fragment, and wherein projecting comprises:
identifying a parent node for the plurality of lexical items in the target language dependency structure;
identifying a right-most one of the plurality of lexical items in the target language text fragment;
assigning the right-most lexical item as dependent from the parent node; and
assigning a remainder of the plurality of lexical items in the target language text fragment as dependent from the right-most lexical item;

determining whether the target language dependency structure is properly indicative of the target language text fragment; and if not, adjusting the target language dependency structure so it is properly indicative of the target language text fragment.

22. The computer readable medium of claim 21 wherein determining comprises:

reading the target language dependency structure to generate a target language text string; and determining whether the lexical items in the target language text string are in a different order than they appear in the target language text fragment.

23. The computer readable medium of claim 22 wherein adjusting the target language dependency structure comprises:

re-arranging the target language dependency structure until lexical items in the target language text string read from the target language dependency structure are the same order that they appear in the target language text fragment.

24. The computer readable medium of claim 23 wherein re-arranging comprises:

identifying a node in the target language dependency tree that is out of order; and re-attaching the identified node at a lowest level in the target language dependency tree that yields a target language string with lexical items in the same order that they appear in the target language text fragment.

25. The computer readable medium of claim 21 wherein obtaining an aligned structure comprises:

parsing the source language text fragment to obtain a source language dependency structure;

segmenting the corresponding target language text fragment into lexical items; and aligning lexical items in the source language dependency structure with lexical items in the target language text fragment.

26. The computer readable medium of claim 25 wherein projecting comprises:

when an unaligned lexical item in the source language dependency structure is not aligned with a lexical item in the target language text fragment, then projecting no dependency from the unaligned lexical item in the source language dependency structure to the target language text fragment.

27. The computer readable medium of claim 21 wherein a dependency in the source language dependency structure is between first and second source lexical items in the source language dependency structure and the first and second source lexical items are aligned with first and second target lexical items in the target language text fragment, respectively, and wherein projecting comprises:

assigning the dependency between the first and second source lexical items to the first and second target lexical items.

28. The computer readable medium of claim 21 wherein an unaligned lexical item in the target language text fragment is unaligned to a lexical item in the source language dependency structure, and wherein projecting comprises:

identifying a lexical item located proximate the unaligned lexical item in the target language text fragment; and assigning the unaligned lexical item as dependent from the identified lexical item.

29. The computer readable medium of claim 28 wherein identifying comprises:

identifying one lexical item, of a set of target language lexical items adjacent the unaligned lexical item in the target language text fragment, that is lowest on the target language dependency structure; and assigning the unaligned lexical item as dependent from the identified lexical item.

30. The computer readable medium of claim 21 a plurality of lexical items in the source language dependency structure are aligned with one lexical item in the target language text fragment, and wherein projecting comprises:

identifying one of the plurality of lexical items in the source language dependency structure that is highest in the source language dependency structure; and assigning a dependency associated with the identified one of the plurality of items in the source language dependency structure to the one lexical item in the target language text fragment.

* * * * *